US012084898B2

(12) United States Patent
Pilested et al.

(10) Patent No.: US 12,084,898 B2
(45) Date of Patent: Sep. 10, 2024

(54) CLOSURE LATCH ASSEMBLY WITH POWER RESET CIRCUIT MECHANISM AND METHOD FOR RESET

(71) Applicant: Magna Closures Inc., Newmarket (CA)

(72) Inventors: Kasper Pilested, Newmarket (CA); Kris Tomaszewski, Newmarket (CA)

(73) Assignee: Magna Closures Inc., Newmarket (CA)

( * ) Notice: Subject to any disclaimer, the term of this patent is extended or adjusted under 35 U.S.C. 154(b) by 421 days.

(21) Appl. No.: 17/440,821

(22) PCT Filed: Apr. 9, 2020

(86) PCT No.: PCT/CA2020/050484
§ 371 (c)(1),
(2) Date: Sep. 20, 2021

(87) PCT Pub. No.: WO2020/210898
PCT Pub. Date: Oct. 22, 2020

(65) Prior Publication Data
US 2022/0178178 A1   Jun. 9, 2022

Related U.S. Application Data

(60) Provisional application No. 62/852,575, filed on May 24, 2019, provisional application No. 62/835,274, filed on Apr. 17, 2019.

(51) Int. Cl.
*E05B 81/86*  (2014.01)
*E05B 81/06*  (2014.01)
(Continued)

(52) U.S. Cl.
CPC .............. *E05B 81/86* (2013.01); *E05B 81/06* (2013.01); *E05B 81/14* (2013.01); *E05B 81/20* (2013.01);
(Continued)

(58) Field of Classification Search
CPC .......... E05B 81/00; E05B 81/04; E05B 81/06; E05B 81/14; E05B 81/18; E05B 81/20;
(Continued)

(56) References Cited

U.S. PATENT DOCUMENTS 6,705,140 B1 * 3/2004 Dimig .................... E05B 81/16
292/216
7,905,523 B2   3/2011 Stefanic et al.
(Continued)

FOREIGN PATENT DOCUMENTS

CN      102545303 A   7/2012
CN      108561034 A   9/2018
(Continued)

*Primary Examiner* — Christopher J Boswell
(74) *Attorney, Agent, or Firm* — Dickinson Wright PLLC

(57) ABSTRACT

The present disclosure relates to a closure latch assembly for a vehicle door, and more particularly to a closure latch assembly for a vehicle door equipped with a powered reset feature. To this end, the present disclosure relates to the use of a power actuator to actuate an actuatable mechanism in a power-on state, and an electronic reset circuit mechanism to reset the actuatable mechanism when the power actuator is in a power-off state. The electronic reset circuit mechanism is coupled to an electric motor associated with the power actuator.

18 Claims, 13 Drawing Sheets

(51) Int. Cl.

| | |
|---|---|
| *E05B 81/14* | (2014.01) |
| *E05B 81/20* | (2014.01) |
| *E05B 81/30* | (2014.01) |
| *E05B 81/34* | (2014.01) |
| *E05B 81/56* | (2014.01) |
| *E05B 81/62* | (2014.01) |
| *E05B 81/82* | (2014.01) |
| *E05B 83/36* | (2014.01) |
| *E05B 85/24* | (2014.01) |
| *E05B 85/26* | (2014.01) |
| *H02K 7/14* | (2006.01) |
| *H02K 11/30* | (2016.01) |
| *H02J 7/00* | (2006.01) |

(52) U.S. Cl.
CPC .............. *E05B 81/30* (2013.01); *E05B 81/34* (2013.01); *E05B 81/56* (2013.01); *E05B 81/62* (2013.01); *E05B 81/82* (2013.01); *E05B 83/36* (2013.01); *E05B 85/243* (2013.01); *E05B 85/26* (2013.01); *H02K 7/14* (2013.01); *H02K 11/30* (2016.01); *H02J 7/0047* (2013.01)

(58) Field of Classification Search
CPC .......... E05B 81/30; E05B 81/34; E05B 81/56; E05B 81/80; E05B 81/82; E05B 81/86; E05B 83/36; E05B 85/24; E05B 85/243; E05B 85/26; H02K 7/14; H02K 11/30; H02K 11/33; H02J 7/0047
See application file for complete search history.

(56) References Cited

U.S. PATENT DOCUMENTS

| | | | |
|---|---|---|---|
| 9,353,556 B2 * | 5/2016 | Margheritti | E05B 81/14 |
| 9,441,402 B2 | 9/2016 | Larsen et al. | |
| 9,957,736 B2 * | 5/2018 | Taurasi | E05B 81/06 |
| 10,087,671 B2 * | 10/2018 | Linden | E05B 81/56 |
| 10,273,725 B2 * | 4/2019 | Van Wiemeersch | E05B 81/90 |
| 10,280,653 B2 * | 5/2019 | Estrada | E05B 81/28 |
| 10,655,368 B2 | 5/2020 | Frello et al. | |
| 10,883,302 B2 * | 1/2021 | Sugiyama | E05F 15/70 |
| 11,072,950 B2 * | 7/2021 | Taurasi | E05B 81/16 |
| 11,162,284 B2 * | 11/2021 | Ottino | E05B 81/15 |
| 11,414,899 B2 * | 8/2022 | Ottino | E05B 81/16 |
| 11,542,730 B2 * | 1/2023 | Yong | E05B 81/56 |
| 2004/0227356 A1 | 11/2004 | Koike et al. | |
| 2008/0224482 A1 | 9/2008 | Cumbo et al. | |
| 2010/0188177 A1 | 7/2010 | Inage | |
| 2011/0107800 A1 * | 5/2011 | Barbier | E05B 81/14 70/237 |
| 2015/0069766 A1 | 3/2015 | Estrada et al. | |
| 2015/0137531 A1 | 5/2015 | Papanikolaou et al. | |
| 2015/0330111 A1 | 11/2015 | Dente et al. | |
| 2015/0330116 A1 | 11/2015 | Dente | |
| 2016/0076279 A1 | 3/2016 | Ilea et al. | |
| 2017/0089104 A1 | 3/2017 | Kowalewski et al. | |
| 2018/0340359 A1 * | 11/2018 | Cumbo | E05B 81/42 |
| 2019/0063117 A1 | 2/2019 | Mozola | |
| 2019/0271179 A1 | 9/2019 | Patane et al. | |
| 2020/0332570 A1 | 10/2020 | Tomaszewski | |
| 2021/0108449 A1 | 4/2021 | Pilested | |
| 2021/0108451 A1 | 4/2021 | Dente et al. | |

FOREIGN PATENT DOCUMENTS

| | | |
|---|---|---|
| EP | 2826938 A2 | 1/2015 |
| EP | 3112565 B1 | 6/2018 |
| FR | 2885156 A1 | 1/2006 |
| WO | 2014082175 A1 | 6/2014 |
| WO | 2020232543 A1 | 11/2020 |

\* cited by examiner

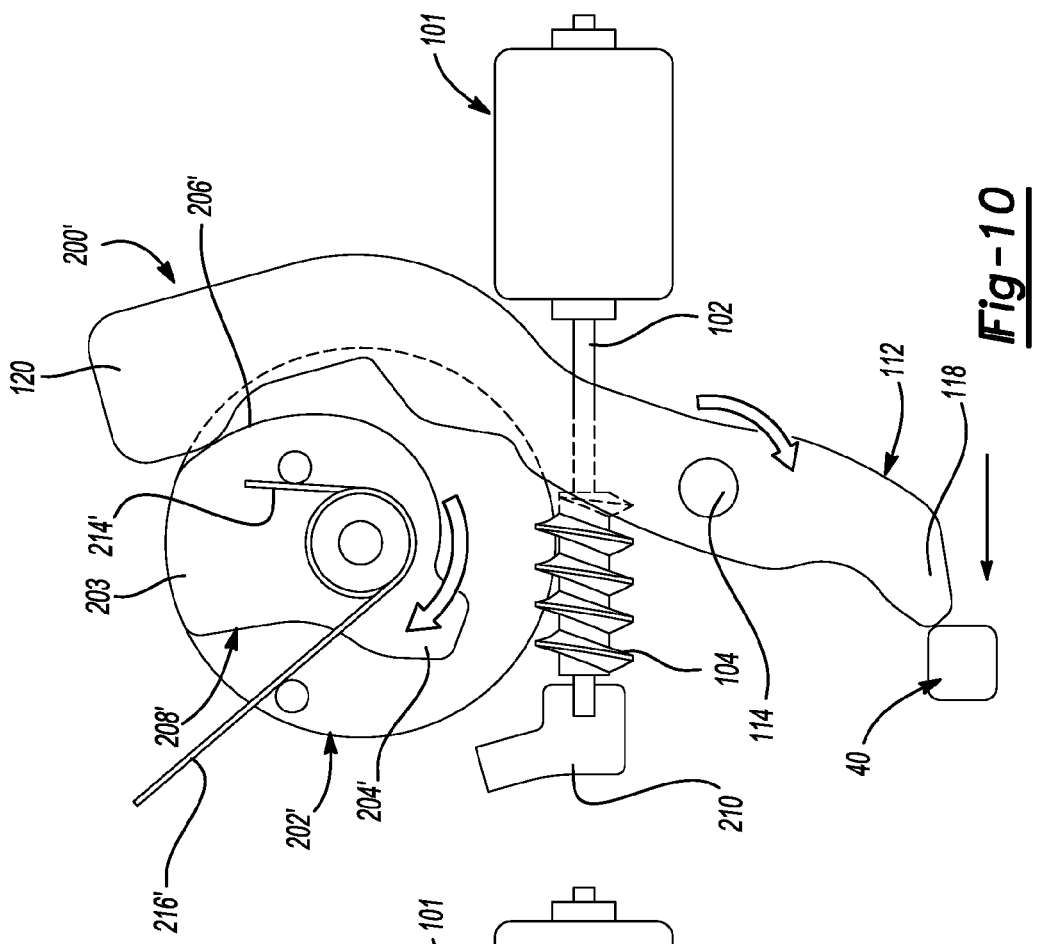
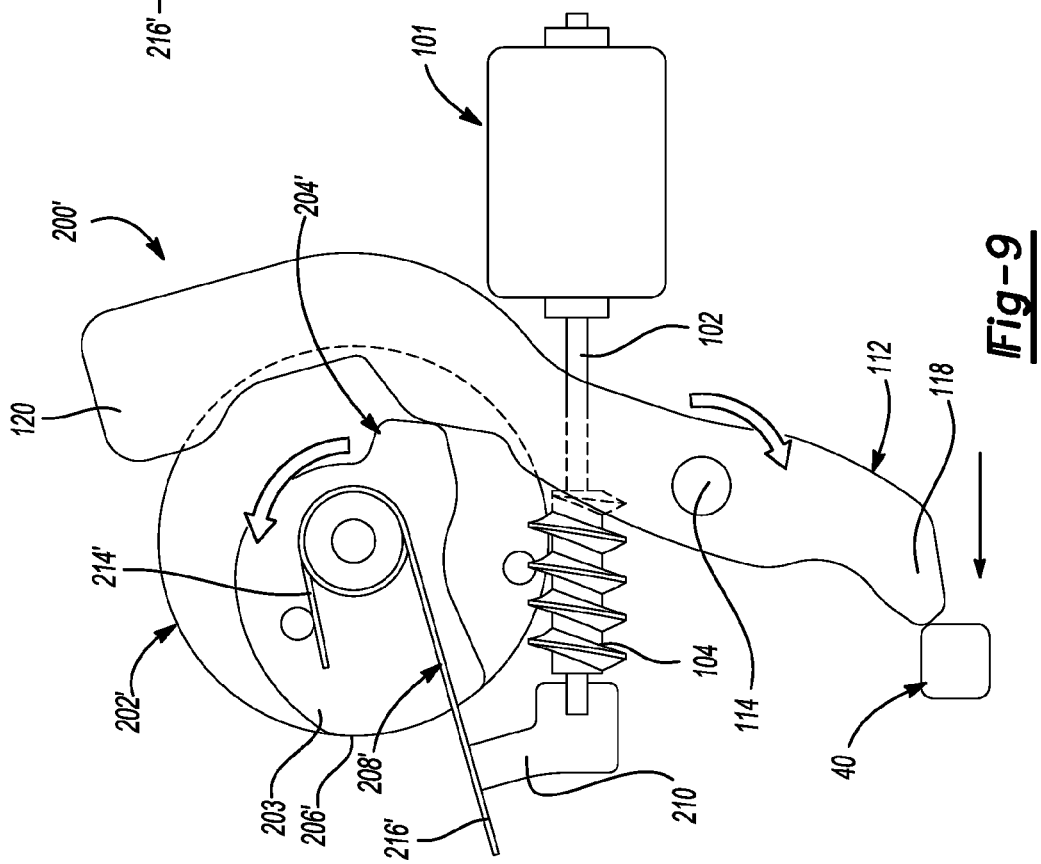

CLOSURE LATCH ASSEMBLY WITH POWER RESET CIRCUIT MECHANISM AND METHOD FOR RESET

CROSS-REFERENCE TO RELATED APPLICATIONS

This application is a U.S. National Stage of International Application No. PCT/CA2020/050484, filed on Apr. 9, 2020, which claims the benefit and priority of U.S. Provisional Patent Application No. 62/835,274, filed on Apr. 17, 2019 and U.S. Provisional Patent Application No. 62/852,575, filed on May 24, 2019, the entire contents of which are incorporated herein by reference.

FIELD

The present disclosure is generally related to closure latch assemblies of the type installed in closure panels used in motor vehicle closure systems. More particularly, the present disclosure is directed to a closure latch assembly having a power-operated actuator operable in a powered state to shift an actuatable mechanism from a non-actuated state into an actuated state, and an actuator reset mechanism operable for subsequently shifting the actuatable mechanism back into its non-actuated state in response to the actuator operating in a non-powered state.

BACKGROUND

This section provides background information related to closure latches and is not necessarily prior art to the closure latch of the present disclosure.

In view of consumer demand for motor vehicles equipped with advanced comfort and convenience features, many modern vehicles are now provided with a passive keyless entry system to permit locking, unlocking and release of closure panels (i.e. passenger doors, tailgates, liftgates, decklids, etc.) without the use of a traditional key-type entry system. Some of the most popular features now available in association with closure systems include power locking/unlocking, power release and power cinching. These "powered" features are provided by a closure latch assembly mounted to the closure panel and equipped with a latch mechanism, a power-operated latch release mechanism and/or a power-operated latch cinch mechanism. Typically, the latch mechanism includes a ratchet and pawl arrangement configured to latch the closure panel in a closed position by virtue of the ratchet being held in a striker capture position to releasably engage and retain a striker that is mounted to a structural portion of the vehicle. The ratchet is held in its striker capture position by the pawl mechanically engaging the ratchet in a ratchet holding position. In many closure latch assemblies, the latch mechanism is configured such that the pawl is operable in its ratchet holding position to mechanically engage and retain the ratchet in at least two distinct striker capture positions, namely a secondary (i.e. "soft close") striker capture position and a primary (i.e. "hard close") striker capture position.

In closure latch assemblies providing a power release feature, a power release actuator is selectively actuated to cause the latch release mechanism to move the pawl from its ratchet holding position into a ratchet releasing position, whereby a ratchet biasing arrangement is permitted to forcibly pivot the ratchet from its striker capture position(s) into a striker release position for releasing the striker and allowing movement of the closure panel from its closed position to an open position. In closure latch assemblies providing a power cinching feature, a power cinch actuator is selectively actuated to cause the latch cinch mechanism to pivot the ratchet from its secondary striker capture position into its primary striker capture position, while the pawl is maintained in its ratchet holding position, thereby cinching the closure panel from a partially-closed position into a fully-closed position. A common electrically powered actuator, or separate electrically-powered actuators, can be associated with the power release and power cinching features. However, the power release feature is typically independent from the power cinching feature.

In many closure latch assemblies providing the power release feature, the latch release mechanism is normally maintained in a non-actuated state and is only shifted into an actuated state when sensors indicate a door release operation has been requested and authenticated by the passive keyless entry system (i.e. via actuation of a key fob or a handle-mounted switch). Actuation of the power release actuator is required for shifting the latch release mechanism from its non-actuated state into its actuated state. Following completion of the power release operation, when the sensors indicate that the ratchet is located in its striker release position, the latch release mechanism must be "reset", that is returned to its non-actuated state, to permit subsequent latching of the latch mechanism upon movement of the closure panel toward its closed position(s).

In closure latch assemblies providing the power cinching feature, the latch cinch mechanism is normally maintained in a non-actuated state and is only shifted into an actuated state when sensors indicate that the ratchet is located in its secondary striker capture position. Actuation of the power cinch actuator is required for shifting the latch cinch mechanism from its non-actuated state into its actuated state. Following completion of the power cinching operation, when the sensors indicate that the ratchet is located in its primary striker capture position, the latch cinch mechanism must be "reset", that is returned to its non-actuated state, to permit subsequent uninhibited movement of the ratchet to its striker release position via actuation of the latch release mechanism.

In many closure latch assemblies providing the power release feature and/or the power cinching feature, the power-operated actuator includes a reverse-drivable electric motor and a gear reduction unit configured to be driven in a first direction to actuate the latch release mechanism and/or the latch cinch mechanism and in a second direction to reset the corresponding mechanisms. In power release configurations, the power release actuator requires an electric motor sized to provide an actuation or "latch opening" force capable of overcoming the frictional forces between the ratchet and pawl, typically due to the seal forces exerted between the striker and the ratchet, for moving the pawl to its ratchet releasing position. In power cinching configurations, the power cinch actuator requires an electric motor sized to provide an actuation or "latch cinching" force capable of pivoting the ratchet from its secondary striker capture position into its primary striker capture position in opposition to the biasing exerted on the ratchet by the ratchet biasing arrangement. In both power configurations, the force requirements associated with the electric motors to reset (i.e., the "reset force") the latch release mechanism and/or the latch cinch mechanism is significantly less than the actuation force.

As noted, the electric motor is driven in the first or "actuation" direction to actuate an actuatable (i.e. latch release, latch cinch, etc.) mechanism and is subsequently driven in the second or "reset" direction to reset the actuatable mechanism. However, reversing powered operation of the electric motor to provide such a "power reset" function is known to generate noise and excessive friction which is undesirable. In addition, a loss of power to the closure latch assembly could prevent power resetting of the actuatable mechanism. As such, some closure latch assemblies include a reset spring which functions in cooperation with the gear reduction unit to back drive the electric motor in the second direction for providing a non-powered reset function. However, system efficiency and complexity is compromised since a large reset spring is required to generate the back drive torque. Alternatively, it is known to have the reset spring interact directly with the motor shaft. However, such a "direct" reset spring configuration, without an intermediate gear reduction arrangement, requires high ratios which, in turn, leads to high tension and stresses acting on the reset spring and its mounting components.

In view of the above, a recognized need exists to address current shortcomings associated with power-operated closure latch assemblies and provide solutions that advance the art and still meet all safety and regulatory requirements, such as a motor reset mechanism configured to provide a non-powered reset function.

SUMMARY

This section provides a general summary of the disclosure and is not intended to be considered as a comprehensive and exhaustive listing of its full scope or all of its aspects, features and objectives.

It is an aspect of the present disclosure to provide a closure latch assembly having a power-operated actuator operable in a powered state to shift an actuatable mechanism from a non-actuated state into an actuated state, and a reset mechanism for subsequently shifting the actuatable mechanism back to its non-actuated state when the power-operated actuator is shifted into a non-powered state so as to provide a non-powered reset function.

It is a related aspect of the present disclosure to configure the power-operated actuator to include an electric motor having a motor shaft, and a gear reduction unit operatively coupling the motor shaft to the actuatable mechanism such that rotation of the motor shaft in a first direction in response to powered operation of the electric motor causes the gear reduction unit to shift the actuatable mechanism from its non-actuated state into its actuated state. The reset mechanism is configured to forcibly rotate the motor shaft in a second direction in response to the electric motor being shifted into its non-powered state so as to cause the gear reduction unit to shift the actuatable mechanism from its actuated state back to its non-actuated state to complete the non-powered reset function.

In a further related aspect, the actuatable mechanism is one of a latch release mechanism and a latch cinch mechanism.

In accordance with these aspects, the reset mechanism includes a coil spring, a drive pulley coupled to the coil assembly, an arbor fixed to the motor shaft and a drive cable connected between the drive pulley and the arbor. Rotation of the motor shaft in the first direction causes the drive cable to wind on the motor shaft and drive the drive pulley in a first direction for loading the coil spring to establish a spring-loaded state for the reset mechanism. Upon the electric motor being powered-off, the spring load in the coil spring is released for mechanically driving the drive pulley in a second direction which, in turn, drives the motor shaft in the second direction to define a spring-released state of the reset mechanism.

In accordance with these and other aspects, the present disclosure is directed to a closure latch assembly for a closure panel of a motor vehicle closure system. The closure latch assembly includes a latch mechanism, and a power actuator having an electric motor with a rotary motor shaft, an actuatable mechanism and a reset mechanism. The latch mechanism is operable in a first state to locate the closure panel in a first position and in a second state to permit movement of the closure panel to a second position. The actuatable mechanism is operable in a non-actuated state to permit the latch mechanism to operate in its first state and in an actuated state to shift the latch mechanism from its first state into its second state. The electric motor is operable in a powered state to drive the motor shaft in an actuation direction for causing the actuatable mechanism to shift from its non-actuated state into its actuated state. The reset mechanism is connected to the motor shaft and is operable in a spring-loaded state when the actuatable mechanism is shifted into its actuated state and is further operable in a spring-released state when the electric motor is operating in a non-powered state. In its spring-released state, the reset mechanism exerts a return torque on the motor shaft which functions to drive the motor shaft in a reset direction which, in turn, causes the actuatable mechanism to shift from its actuated state into its non-actuated state, thereby providing a non-powered reset function.

The closure latch assembly of the present disclosure is configured such that the actuatable mechanism is a latch release mechanism operable in its non-actuated state to maintain the latch mechanism in either of its first (latched) and second (unlatched) state and is operable in its actuated state to shift the latch mechanism from its latched state into its unlatched state. The latch mechanism is operable in its latched state to hold the closure panel in its first (closed) position and is operable in its unlatched state to permit movement of the closure panel to its second (open) position. The shifting of the reset mechanism into its spring-released state results in the return torque being exerted on the motor shaft for rotating the motor shaft in the reset direction so as to drive the latch release mechanism back to its non-actuated state with the power release electric motor in its non-powered state.

The closure latch assembly of the present disclosure is configured such that the actuatable mechanism is a latch cinch mechanism operable in its non-actuated state when the latch mechanism is operating in its first (secondary latched) state for holding the closure panel in its first (partially closed) position. The latch cinch mechanism is operable in its actuated state to shift the latch mechanism from its secondary latched state into its secondary (primary latched) state for moving the closure panel from its partially-closed position to its second (fully-closed) position. The shifting of the reset mechanism into its spring-released state results in the return torque being applied to the motor shaft for rotating the motor shaft in the reset direction so as to drive the latch cinch mechanism back to its non-actuated state with the power cinch electric motor in its non-powered state.

In accordance with these alternative, non-limiting embodiments, the reset mechanism is operably associated with a shaft extension segment of the motor shaft and is configured to provide a reduction ratio without use of a gearset by using a pulley-type arrangement. This arrangement includes an arbor fixed to the shaft extension segment of the motor shaft, a pulley, a drive cable wound on the pulley and having a first end fixed to the arbor and a second end fixed to the pulley, and a reset spring acting on the pulley. The spring is pre-loaded and configured to bias the pulley to rotate in a first direction which, in turn, biases the motor shaft to rotate in its reset direction. Rotation of the motor shaft in the actuation direction in response to powered operation of the electric motor causes the drive cable to wind on the motor shaft extension and drive the pulley in a second direction, thereby loading the reset spring and establishing the spring-loaded state. Upon the electric motor being powered off, the spring load of the reset spring is permitted to drive the pulley in the first direction so as to drive the motor shaft in the reset direction.

It is another aspect of the present disclosure to provide a closure latch assembly for a vehicle having a latch mechanism, a latch release mechanism, and a power release mechanism for controlling powered actuation of the latch release mechanism to provide a power releasing function. The power release mechanism is also configured to provide a non-powered reset function.

It is yet another aspect of the present disclosure to provide another closure latch assembly for a closure panel of a motor vehicle. The closure latch assembly includes a latch mechanism operable in a first state to locate the closure panel in a first position and in a second state to locate the closure panel in a second position. The closure latch assembly also includes a power actuator that includes an actuatable mechanism being operable in a non-actuated state to permit the latch mechanism to operate in its first state and in an actuated state to shift the latch mechanism from its first state into its second state. The power actuator includes an electric motor having a rotary motor shaft and a controlling circuit selectively coupled to the electric motor for controlling the electric motor in a power-on state to drive the motor shaft in an actuation direction for causing the actuatable mechanism to shift from its non-actuated state into its actuated state. The power actuator additionally includes an electronic reset circuit mechanism having an energy storage device. The electronic reset circuit mechanism is operatively coupled to the electric motor and is configured to operate in an energy storing state to store electrical energy supplied to the electric motor in the energy storage device in response to the controlling circuit being coupled to the electric motor and rotating the rotary motor shaft in the actuation direction from a first position to a second position. The electronic reset circuit mechanism is also configured to transition from its energy storing state into an energy discharge state in response to the actuatable mechanism being in its actuated state and the controlling circuit being decoupled from the electric motor. The electronic reset circuit mechanism is operable in its energy discharge state to discharge the electrical energy from the energy storage device into the electric motor in an opposite polarity direction for causing the electric motor to rotate the rotary motor shaft in a reset direction from its second position back to its first position so as to reset the actuatable mechanism in its non-actuated state for providing a powered reset function.

It is another aspect of the present disclosure to provide a method of operating a power actuator for a closure latch assembly including an electric motor and an electronic reset circuit mechanism including an energy storage device coupled in parallel with the electric motor. The method includes the step of supplying energy to an electric motor to rotate a rotary motor shaft of the electric motor in an actuation direction using a controlling circuit coupled to the electric motor. The method proceeds by capturing and storing electric energy supplied to the electric motor in the energy storage device in response to the controlling circuit being coupled to the electric motor and rotating the rotary motor shaft in the actuation direction from a first position to a second position using the electronic reset circuit mechanism. The method continues with the step of discharging the electrical energy from the energy storage device into the electric motor in an opposite polarity direction and causing the electric motor to rotate the rotary motor shaft in a reset direction opposite the actuation direction from the second position back to the first position in response to the rotary motor shaft being in the second position and the controlling circuit being decoupled from the electric motor using the electronic reset circuit mechanism.

In yet another aspect of the disclosure, there is provided a method of operating a power actuator for a closure latch assembly including an electric motor and an electronic reset circuit mechanism including an energy storage device, the method including the steps of controlling the electronic reset circuit mechanism to supply energy to the electric motor from a main power supply to rotate a rotary motor shaft of the electric motor in a first direction, and controlling the electronic reset circuit mechanism to supply energy to the electric motor from the energy storage device to rotate the rotary motor shaft of the electric motor in second direction in response to the energy from the main power supply being not supplied.

In yet another aspect, there is provided an electronic reset system of a closure latch assembly including a main power supply, an electric motor having a motor shaft driven in one of an actuation direction and a reset direction, a secondary power supply operatively coupled to the electric motor, and an electronic reset circuit mechanism coupled to the electric motor and to the secondary power supply and to the main power supply, the electronic reset circuit mechanism configured to control the electric motor using power supplied from the main power supply when power is being supplied from the main power supply to drive the motor shaft in the actuation direction and to control the electric motor using power supplied from the secondary power supply when power is not being supplied from the main power supply to drive the motor shaft in the reset direction. The electronic reset circuit mechanism may be configured to detect when the power is stopped being supplied and in response control the electric motor using power supplied from the secondary power supply.

It is another aspect of the present disclosure to provide a method of operating a power actuator for a closure latch assembly including an electric motor and an electronic reset circuit mechanism including an energy storage device coupled in parallel with the electric motor. The method includes the step of supplying energy to an electric motor to rotate a rotary motor shaft of the electric motor in an actuation direction. The method proceeds by capturing and storing electric energy supplied to the electric motor in the energy storage device. The method continues with the step of discharging the electrical energy from the energy storage device into the electric motor in an opposite polarity direction and causing the electric motor to rotate the rotary motor shaft in a reset direction opposite the actuation direction from the second position back to the first position.

In accordance with another aspect there is provided a closure latch assembly for a closure panel of a motor vehicle including a latch mechanism operable in a first state to locate the closure panel in a first position and in a second state to locate the closure panel in a second position, a power actuator including an actuatable mechanism being operable in a non-actuated state to permit the latch mechanism to operate in its first state and in an actuated state to shift the latch mechanism from its first state into its second state, the power actuator including an electric motor having a rotary motor shaft and a controlling circuit coupled to the electric motor for controlling the electric motor in a power-on state to drive the motor shaft in an actuation direction from a first position to a second position for causing the actuatable mechanism to shift from its non-actuated state into its actuated state, the power actuator including an electronic reset circuit mechanism having an energy storage device and operatively coupled to the electric motor and configured to operate in an energy storing state to store electrical energy, the electronic reset circuit mechanism configured to transition from its energy storing state into an energy discharge state in response to the actuatable mechanism being operated in a power reset mode for powering the electric motor using the stored electrical energy to cause the actuatable mechanism to shift from the second position to the first position so as to reset the actuatable mechanism in its non-actuated state for providing a powered reset function.

In a related aspect, the electronic reset circuit mechanism is configured to store electrical energy in the energy storage device at or below a predetermined threshold voltage level of the energy storage device in response to a detected temperature.

In a related aspect, the electronic reset circuit mechanism is configured to limit the stored electrical energy in the energy storage device at or below a predetermined threshold voltage level of the energy storage device.

In accordance with another aspect there is provided a closure latch assembly for a closure panel of a motor vehicle including a latch mechanism operable in a first state to locate the closure panel in a first position and in a second state to locate the closure panel in a second position, a power actuator including an actuatable mechanism being operable in a non-actuated state to permit the latch mechanism to operate in its first state and in an actuated state to shift the latch mechanism from its first state into its second state, the power actuator including an electric motor having a rotary motor shaft, an energy storage device operatively coupled to the electric motor and configured to operate in an energy storing state to store electrical energy and an energy discharging state to supply the electric motor with the stored electrical energy, and a controller coupled to the electric motor and the energy storage device, the controller configured to control the electric motor in a power-on state to drive the motor shaft in an actuation direction from a first position to a second position for causing the actuatable mechanism to shift from its non-actuated state into its actuated state, and configured to configured to control the transition of the energy storage device from its energy storing state into an energy discharge state in response to the actuatable mechanism being operated in a power reset mode for powering the electric motor using the stored electrical energy to cause the actuatable mechanism to shift from the second position to the first position so as to reset the actuatable mechanism in its non-actuated state for providing a powered reset function.

In accordance with yet another aspect there is provided an electronic reset system of a closure latch assembly. The electronic reset system includes an electric motor having a motor shaft driven in one of an actuation direction and a reset direction opposite the actuation direction for moving an actuatable mechanism between an actuated and a non-actuated state. An energy storage device is operatively coupled to the electric motor and is configured to operate in an energy storing state to store electrical energy and in an energy discharge state to discharge the electrical energy. A controller is coupled to the electric motor and the energy storage device. The controller is configured to control the electric motor in a power-on state to drive the motor shaft in the actuation direction from a first position to a second position for causing the actuatable mechanism to shift from its non-actuated state into its actuated state.

Further areas of applicability will become apparent from the description provided herein. The description and specific embodiments listed in this summary are for purposes of illustration only and are not intended to limit the scope of the present disclosure.

BRIEF DESCRIPTION OF THE DRAWINGS

The drawings described herein have been provided to illustrate selected embodiments and specific features thereof and are not intended to limit the scope of the present disclosure. The present disclosure will now be described by way of example only with reference to the attached drawings, in which:

FIG. 9 is similar to FIG. 8 except that the power release gear is shown rotated from its neutral/home position to its first released position for providing a spring-loaded resetting function;

FIG. 10 shows the power release gear rotated from its neutral/home position to its second released position;

DETAILED DESCRIPTION

Figure 1:
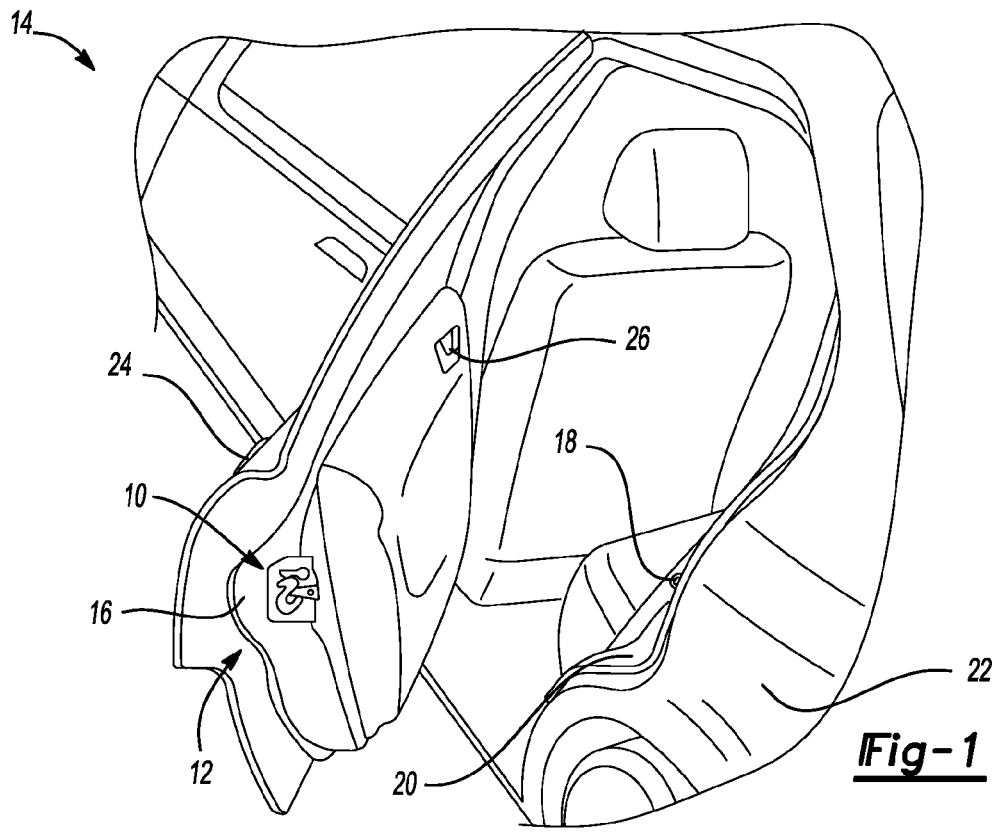
FIG. 1 is an isometric view of a motor vehicle with a passenger door that is equipped with a closure latch assembly embodying the teaching of the present disclosure.

Example embodiments of closure latch assemblies for use in motor vehicle door closure systems are provided so that this disclosure will be thorough, and will fully convey the scope to those who are skilled in the art. The present disclosure is specifically directed to implementing a non-powered reset mechanism in the closure latch assembly in association with a power-operated actuatable mechanism. While the actuatable mechanism is disclosed to be a latch release mechanism, the teachings of the present disclosure relating to the non-powered reset mechanism are applicable to use with other power actuators. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring initially to FIG. 1, a closure latch assembly 10 for a passenger door 12 of a motor vehicle 14 is shown positioned along a rear edge portion 16 of door 12 and is configured to releasably engage a striker 18 secured in a door opening 20 formed in the vehicle's body 22 in response to movement of door 12 from an open position (shown) to a closed position. Door 12 includes an outside door handle 24 and an inside door handle 26, both of which are operatively coupled (i.e. electrically and/or mechanically) to closure latch 10.

Figure 2:
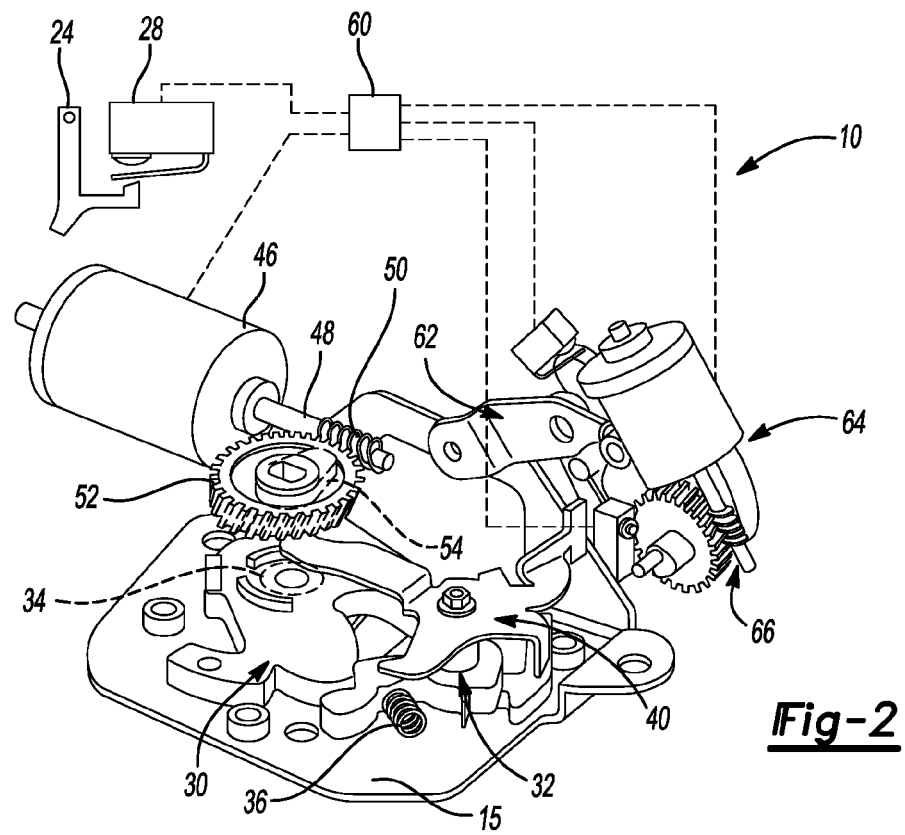
FIG. 2 is an isometric view of a closure latch assembly equipped with a latch mechanism and a power-operated latch release mechanism.

Referring now to FIG. 2, a non-limiting embodiment of closure latch assembly 10 is shown to generally include a latch mechanism, a latch release mechanism, a power release actuator, and a power lock actuator. The latch mechanism includes a ratchet 30 and a pawl 32. Ratchet 30 is mounted to a latch plate 15 and moveable between a first or "striker capture" position whereat the ratchet 30 retains striker 18 and a second or "striker release" position whereat ratchet 30 permits release of striker 18. A ratchet biasing member, such as a torsion spring 34, biases ratchet 30 toward its striker release position. Pawl 32 is also mounted to latch housing 15 and is pivotably moveable relative to ratchet 30 between a first or "ratchet holding" position whereat pawl 32 holds ratchet 30 in its striker capture position and a second or "ratchet releasing" position whereat pawl 32 permits ratchet 30 to move to its striker release position. A pawl biasing member, such as a coil spring 36, biases pawl 32 toward its ratchet holding position. With pawl 32 located in its ratchet holding position for mechanically holding ratchet 30 in its striker capture position, the latch mechanism is considered to be operating in a latched state. In contrast the latch mechanism is considered to be operating in an unlatched state when pawl 32 is located in its ratchet releasing position and ratchet 30 is located in its striker release position.

The latch release mechanism includes, among other things, a pawl release lever 40 operatively connected to pawl 32 and which is movable between a first or "pawl release" position whereat pawl release lever 40 causes pawl 32 to move from its ratchet holding position to its ratchet releasing position and a second or "home" position whereat pawl release lever 40 permits pawl 32 to be maintained in its ratchet holding position. A pawl release lever biasing member, such as a suitable pawl release lever spring 42, is provided to bias pawl release lever 40 to its home position. Pawl release lever 40 may be moved from its home position to its pawl release position by several components such as, for example, inside and/or outside handle-actuated release mechanisms in addition to the power release actuator. With pawl release lever 40 located in its home position, the latch release mechanism is defined to be operating in a non-actuated state. In contrast, the latch release mechanism is defined to be operating in an actuated state when pawl release lever 40 is located in its pawl release position.

The power release actuator includes, among other things, a power release electric motor 46 having a rotatable motor shaft 48, a power release worm gear 50 secured for rotation with motor shaft 48, a power release gear 52, and a power release cam 54. Power release worm gear 50, power release gear 52, and a power release cam 54 are examples of components forming a release chain between the motor 46 and the actuatable mechanism, and may further include other levers and gears and interconnections for coupling the rotation of the shaft 48 into a movement of the actuatable mechanism. Components of the kinematic chain have been pivotally mounted about a pivot, such as a shaft, so that reset mechanism may act to move, such as rotate, one of the components of the kinematic chain, for example by acting on the shaft supporting the components of the kinematic chain for rotation, in a manner as will be described in more details herein below. Power release cam 54 is connected for common rotation with power release gear 52 and is rotatable between a first or "pawl release" range of positions and a second or "pawl non-release" range of positions. Power release gear 52 is driven by worm gear 50 in response to actuation of power release motor 46 and, in turn, drives power release cam 54 which controls the pivoting movement of pawl release lever 40 between its home and pawl release positions. The tooth mesh characteristics of power release gear 52 and worm gear 50 establish a reduction ratio torque multiplication between motor shaft 48 and power release cam 54.

The power release actuator may be used as part of a passive entry system to provide the power release feature. When a person approaches vehicle 14 with an electronic key fob and actuates outside door handle 24, an electronic latch release system associated with vehicle 14 senses both the presence of the key fob and that outside door handle 24 has been actuated (e.g. via communication between a switch 28 and an electronic control unit (ECU) shown at 60 that at least partially controls the operation of closure latch assembly 10). In turn, ECU 60 actuates the power release actuator to actuate the latch release mechanism for releasing the latch mechanism and unlatch closure latch assembly 10 so as to open the vehicle door.

The power lock actuator controls the operative connection between an inside release lever 62 associated with the inside door release mechanism and pawl release lever 40. The power lock actuator includes, among other things, a power lock electric motor 64 and a lock a 66.

Figure 3:
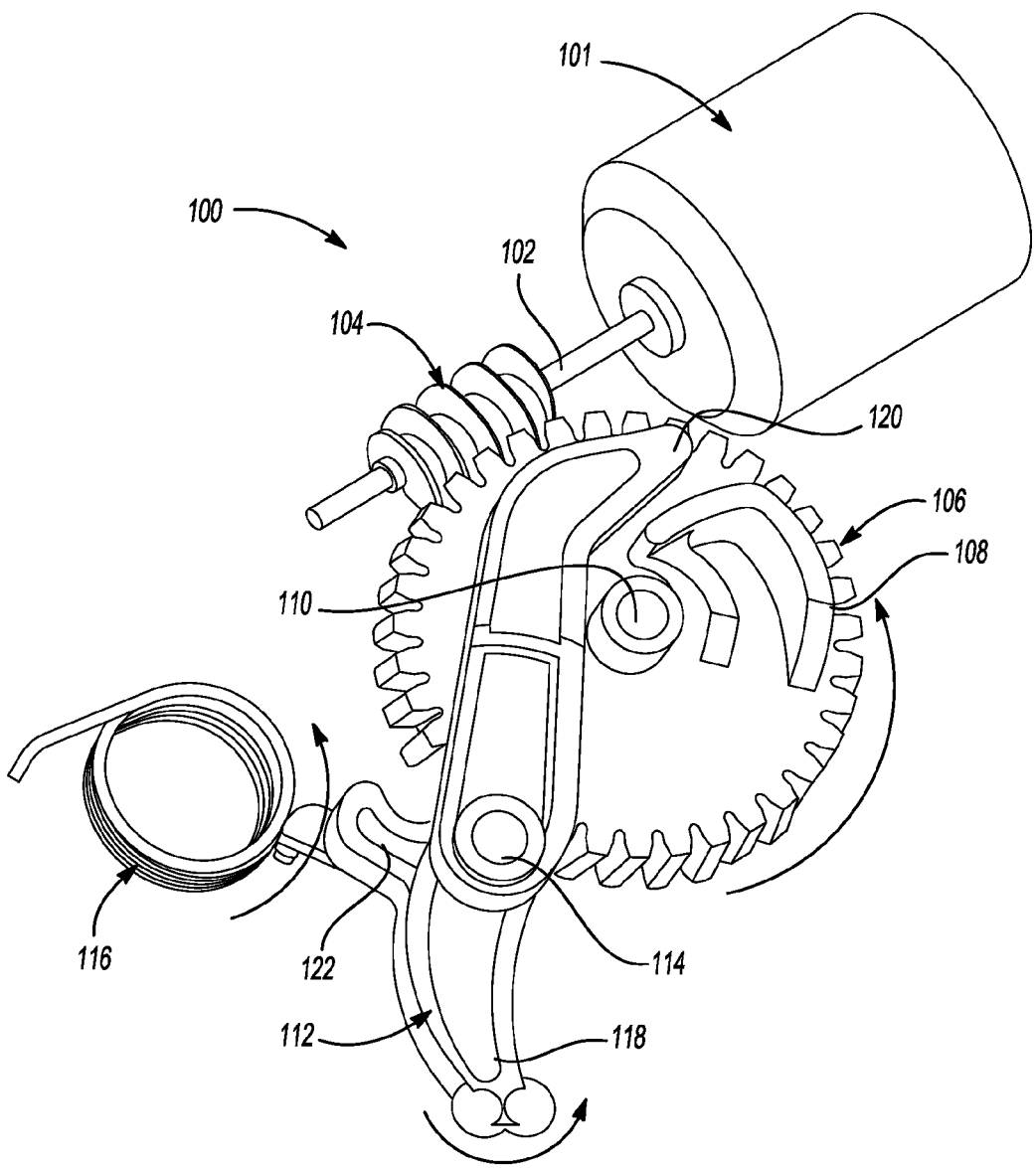
FIG. 3 is an isometric view showing various components of the power-operated latch release mechanism associated with the closure latch assembly shown in FIG. 2.

Referring now to FIG. 3, the components associated with a non-limiting embodiment of a power release actuator 100 adapted for use with closure latch assembly 10 are shown to include a power release electric motor 101 with a motor shaft 102 driving a worm gear 104, and a power release gear 106 having a release cam 108 formed thereon. Power release gear 106 is rotatable about a post 110 in a first or "releasing" (i.e. counterclockwise) direction and a second or "resetting" (i.e. clockwise) direction via actuation of power release motor 101. Power release gear 106 is rotatable about post 110 between a "home" position (shown) and a "released" position for causing pivotal movement of an actuator release lever 112 from a first or "non-actuated" position (shown) into a second or "actuated" position. Actuator release lever 112 is supported for pivotal movement relative to a pivot post 114 and is normally biased toward its non-actuated position by an actuator lever spring 116. Actuator lever 112 is operable in its non-actuated position to disengage its first leg segment 118 from pawl release lever 40, when located in its home position, so as to permit pawl 32 to remain in its ratchet holding position. In contrast, movement of actuator lever 112 from its non-actuated position to its actuated position causes its first leg segment 118 to engage and pivot pawl release lever 40 from its home position to its pawl release position, thereby causing pawl 32 to move from its ratchet holding position to its ratchet releasing position. A second leg segment 120 of actuator release lever 112 is engageable with release cam 108 due to the biasing of actuator lever spring 116. As such, rotation of power release gear 106 in its releasing direction from its home position to its released position causes corresponding pivotal movement of actuator release lever 112 from its non-actuated position into its actuated position. Likewise, rotation of power release gear 106 in its resetting direction from its released position to its home position results in corresponding pivotal movement of actuator release lever 112 from its actuated position to its non-actuated position.

Figure 4:
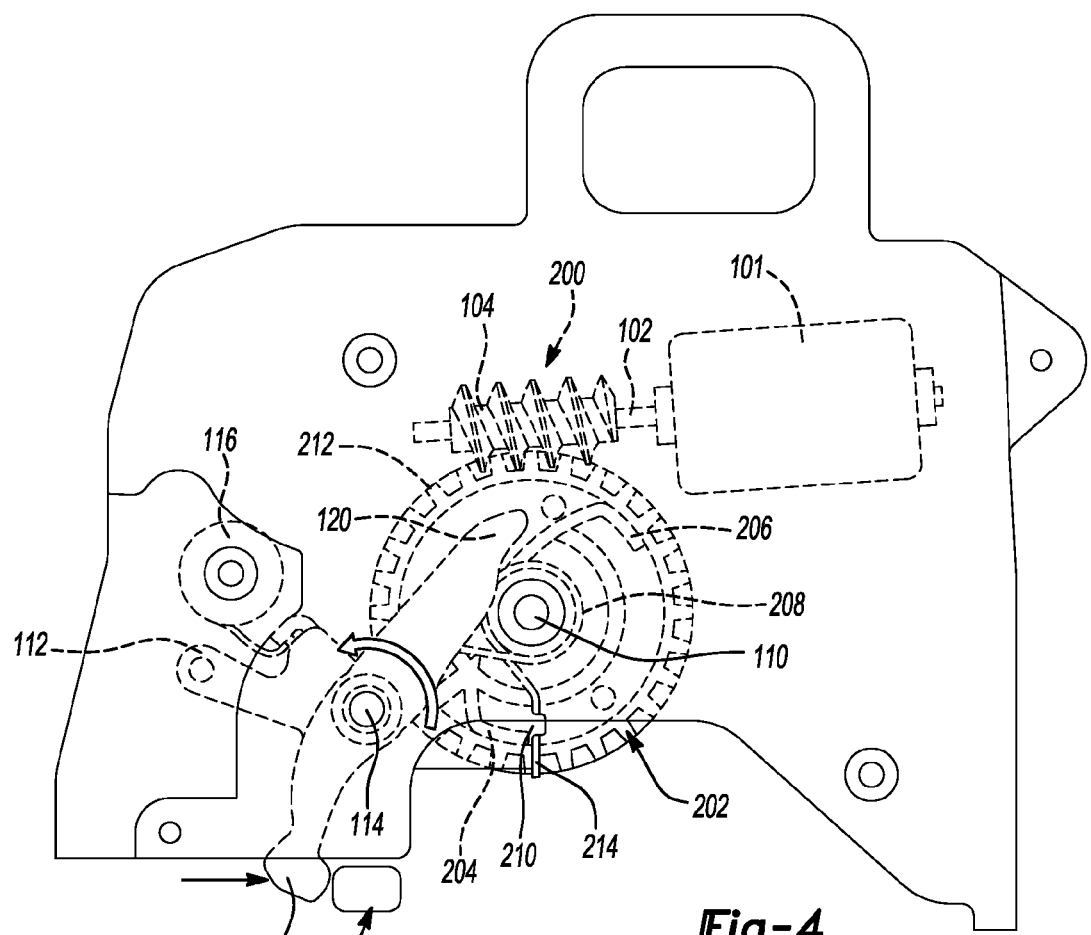
FIG. 4 is a plan view of the components associated with an alternative configuration of a bidirectional power-operated latch release mechanism associated with the closure latch assembly of the present disclosure.
Figure 5:
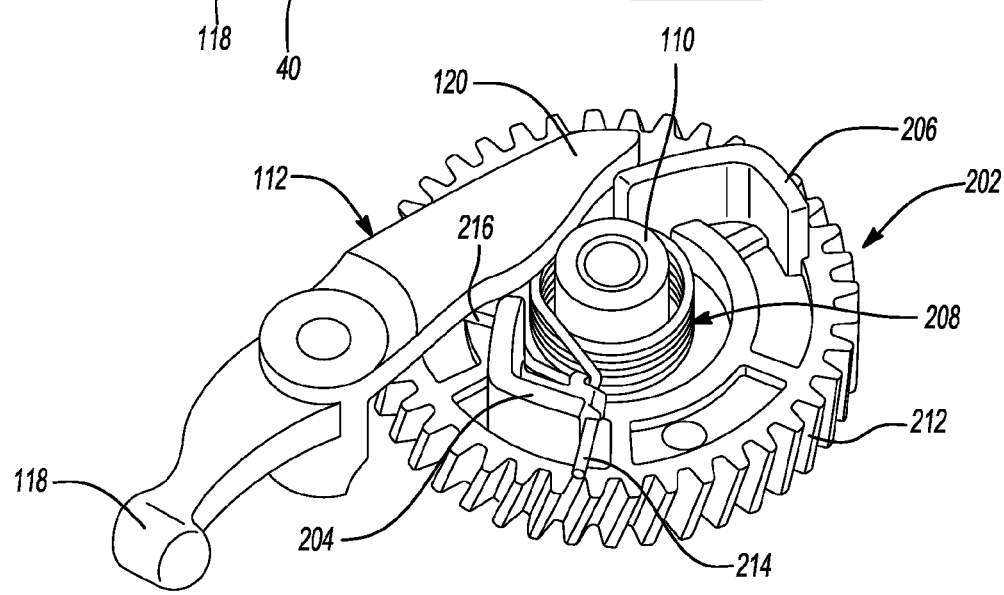
FIG. 5 is an isometric view of various components associated with the power-operated latch release mechanism shown in FIG. 4.

Referring now to FIG. 4, a power release actuator 200 is shown which is generally a modified version of power release actuator 100 (FIG. 3) and includes many similar components identified hereinafter and in the drawings using common reference numerals. Power release actuator 200 is configured to provide a bi-directional releasing function, with each directional releasing operation associated with a distinct operating mode for closure latch assembly 10. As seen, power release actuator 200 includes power release electric motor 101 with its motor shaft 102 driving worm gear 104, a power release gear 202 having a power release cam 204 and an emergency release cam 206, and a return spring 208 acting between power release gear 202 and a latch housing 210. Power release gear 202 has gear teeth 212 meshed with worm gear 104 such that rotation of motor output shaft 102 in a first direction causes corresponding rotation of power release gear 202 in a first (i.e. clockwise) direction and rotation of motor output shaft 102 in a second direction causes corresponding rotation of power release gear 202 in a second (i.e. counterclockwise) direction. First and second directions may be in a same direction, or may be in opposite directions.

Power release gear 202 is shown in FIGS. 4, 5, 6A and 7A located in a neutral/home position with actuator release lever 112 located in its non-actuated position such that pawl release lever 40 is located in its home position with pawl 32 located in its ratchet holding position, thereby maintaining ratchet 30 in its striker capture position for establishing the Latched mode of closure latch assembly 10. In its neutral/home position, power release gear 202 is positioned such that neither of power release cam 204 and emergency release cam 206 are acting on actuation leg segment 120 of actuator release lever 112.

Figure 6B:
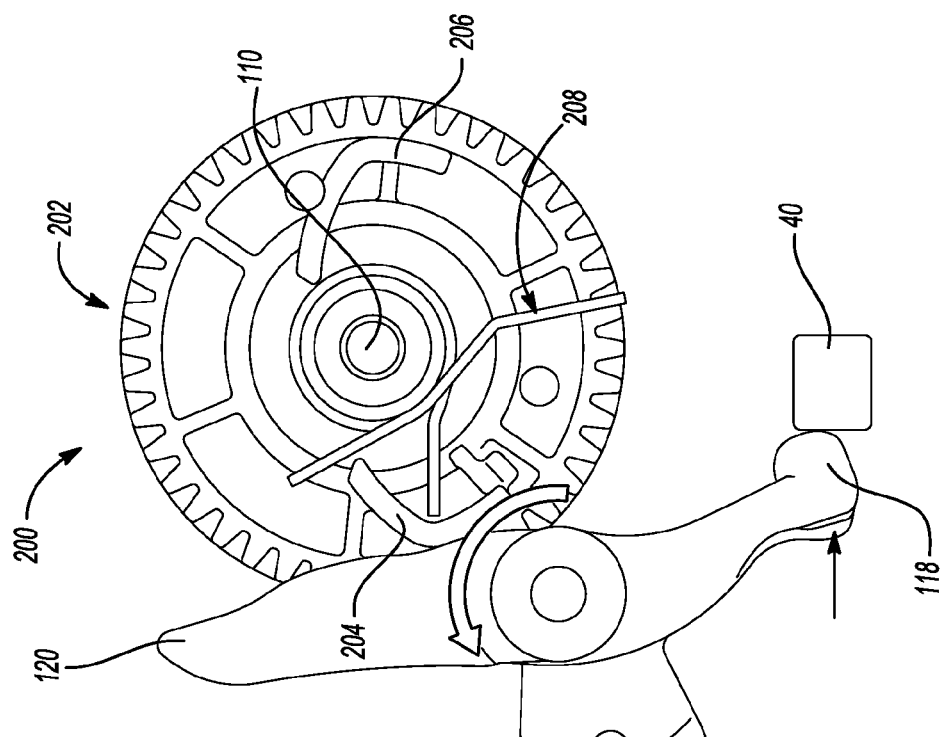
FIG. 6B illustrates the power release gear rotated in a first direction from its neutral/home position to a first released position when the closure latch is operating in a normal mode.
Figure 6A:
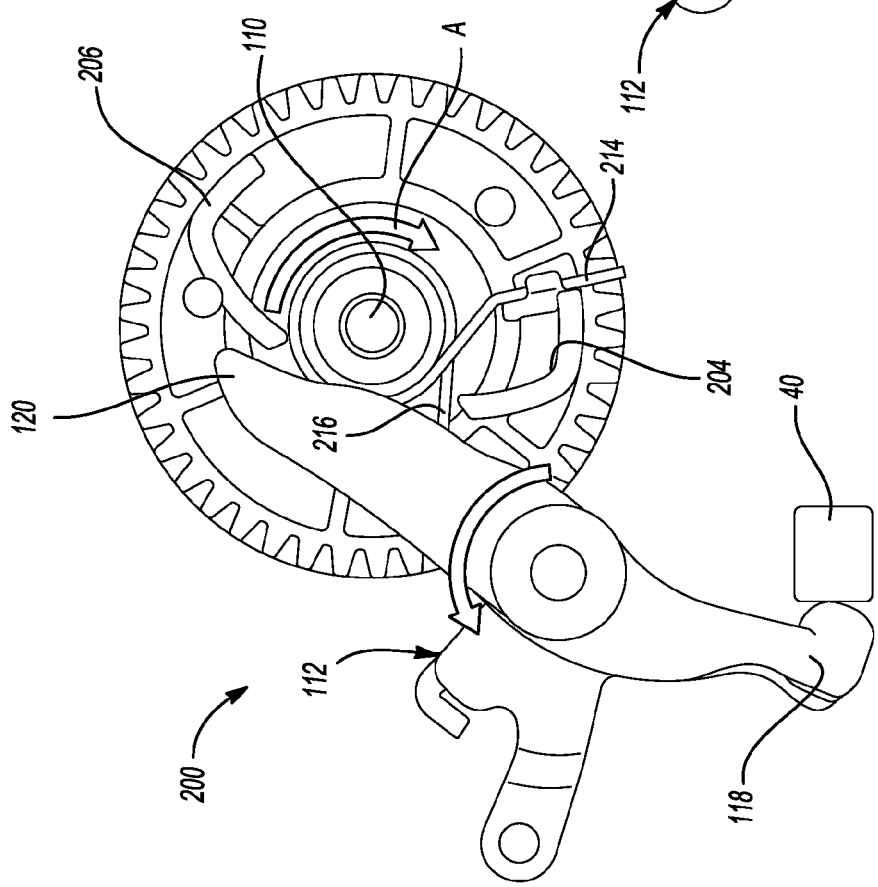
FIG. 6A illustrates a power release gear associated with the power-operated latch release mechanism shown in FIGS. 4 and 5 located in a neutral/home position.

When control unit 60 indicates that closure latch assembly 10 is supplied with electrical power from the vehicle's primary power source (i.e. the battery), power release actuator 200 is considered to be operating in a "normal release" mode. As such, when a power release signal is provided to closure latch assembly 10, power release electric motor 101 is energized to rotate power release gear 202 in a first releasing direction (i.e. clockwise), as indicated by arrow "A", from its neutral/home position (FIG. 6A) to a first released position (FIG. 6B). Such rotation of power release gear 202 causes power release cam 204 to engage actuator leg segment 120 of actuator release lever 112 and forcibly pivot actuator release lever 112, in opposition to the biasing of spring 116, from its non-actuated position to its actuated position for causing pawl 32 to move to its ratchet releasing position, thereby releasing ratchet 30 for movement to its striker release position. However, such rotation of power release gear 202 causes return spring 208 to be compressed (i.e. loaded) since its first end segment 214 is secured to power release gear 202 and its second end segment 216 engages a stationary portion of latch housing 210. Upon completion of the power release of the latch mechanism, a non-powered resetting function is completed. Specifically, power release motor 101 is turned off and return spring 208 backdrives power release gear 202 from its first released position (FIG. 6B) back to its neutral/home position (FIG. 6A) which, in turn, backdrives motor shaft 102 and electric motor 101. Since power release gear 202 is mechanically reset during operation of closure latch assembly 10 in its normal operating mode, no noise is generated as is typically associated with powered resetting of the power release actuator.

Figure 7B:
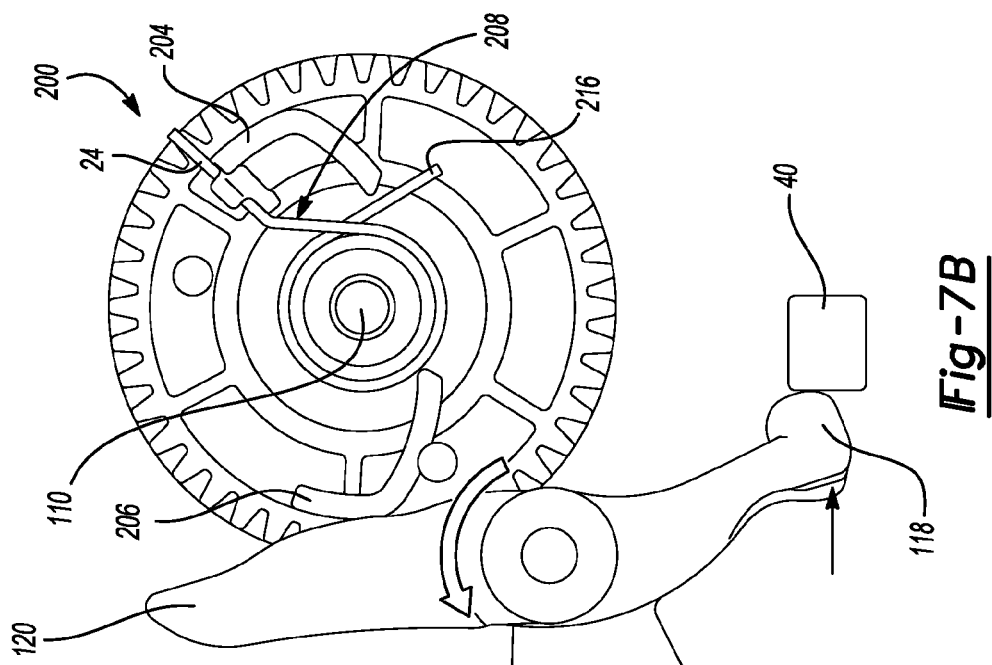
FIG. 7A illustrates the power release gear located in its neutral/home position and FIG. 7B illustrates rotation of the power release gear in a second or "emergency" release direction from its neutral/home position to a second released position when the closure latch assembly is operating in an emergency mode.
Figure 7A:
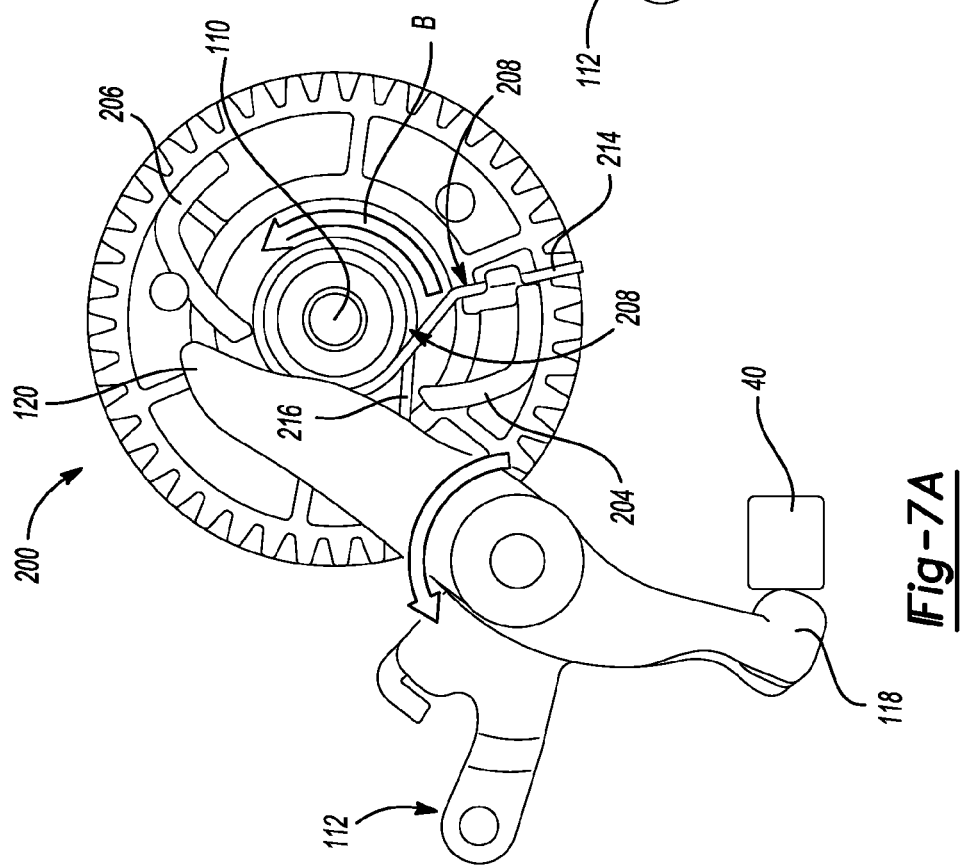

When control unit 60 indicates that closure latch assembly 10 is not supplied with electrical power from the vehicle's primary power source and may be relying on a backup power source (i.e. supercapacitors), power release mechanism 200 is considered to be operating in an "emergency release" mode. As such, when a signal is provided to release closure latch assembly 10, power release motor 101 is energized to rotate power release gear 202 in a second releasing direction (i.e. counterclockwise), as indicated by arrow "B", from its neutral/home position (FIG. 7A) to a second released position (FIG. 7B). Such rotation of power release gear 202 causes emergency release cam 206 to engage actuation leg segment 120 and forcibly pivot actuator release lever 112, in opposition to the biasing of spring 116, from its non-actuated position into its actuated position for causing pawl 32 to move to its ratchet releasing position, thereby releasing ratchet 30 for movement to its striker release position. However, such rotation of power release gear 202 in the second releasing direction does not act to cause return spring 208 to be loaded since its second end segment 216 is no longer engaged with a stationary component of latch housing 210. Thus, power release gear 202 is held in its second released position. Subsequent resetting of power release actuator 200, required for moving power release gear 202 from its second released position back to its neutral/home position, is completed either manually (if no power) or electrically (via backup power) by driving power release motor 101 in the opposite direction.

Figure 8:
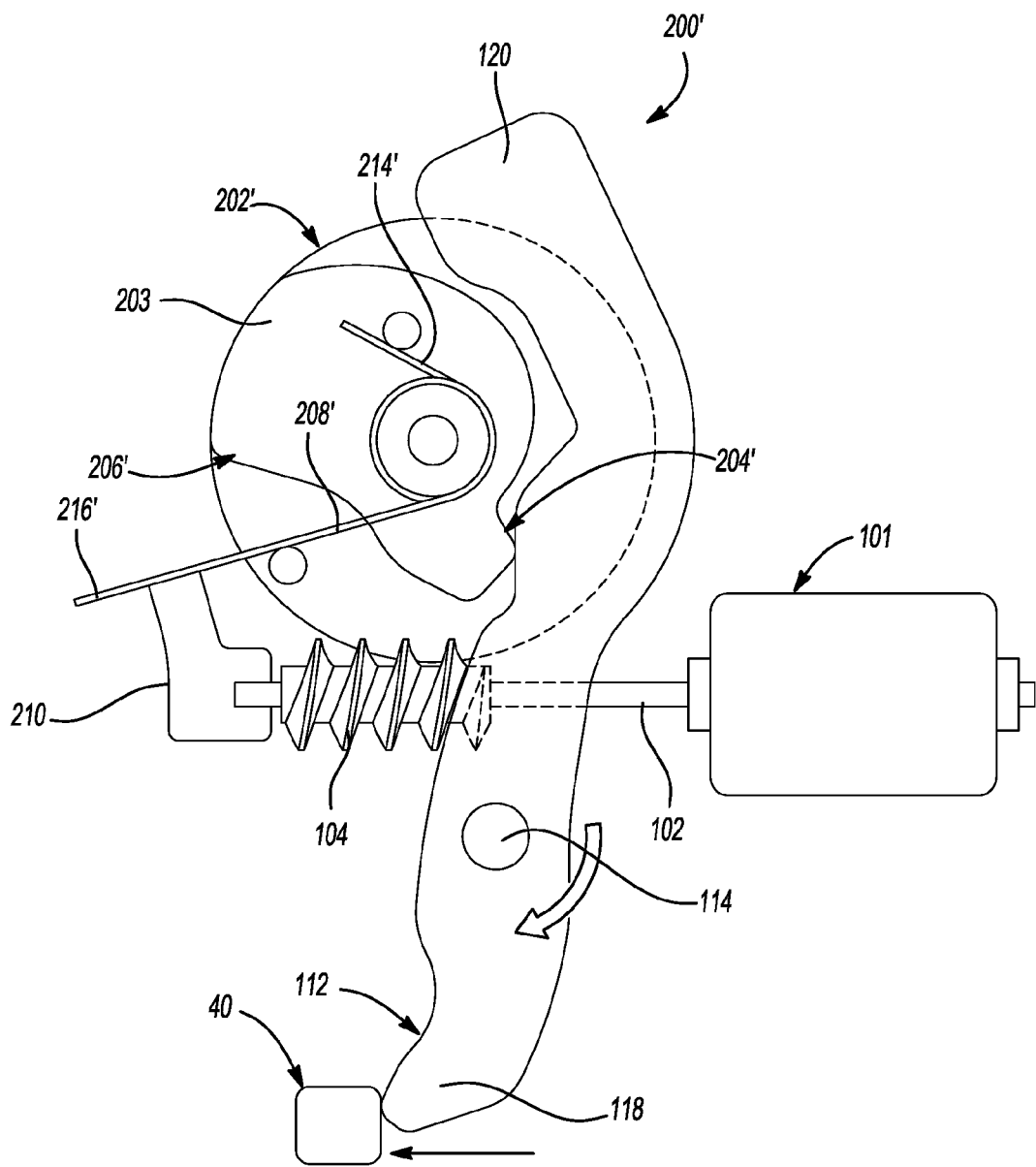
FIG. 8 illustrates another version of a bidirectional power-operated latch release mechanism with the power release gear shown in its neutral/home position.

Referring now to FIGS. 8-10, a modified version of power release actuator 200 is shown as power release actuator 200' and is generally identical thereto with the exception that power release gear 202' has a common cam 203 defining both a power release cam segment 204' and an emergency release cam segment 206'. In other words, a single integral common cam is provided that defines both the power release cam and the emergency release cam. Otherwise, the functionality and operation of power release actuator 200' is substantially similar to that of power release actuator 200.

Figure 11:
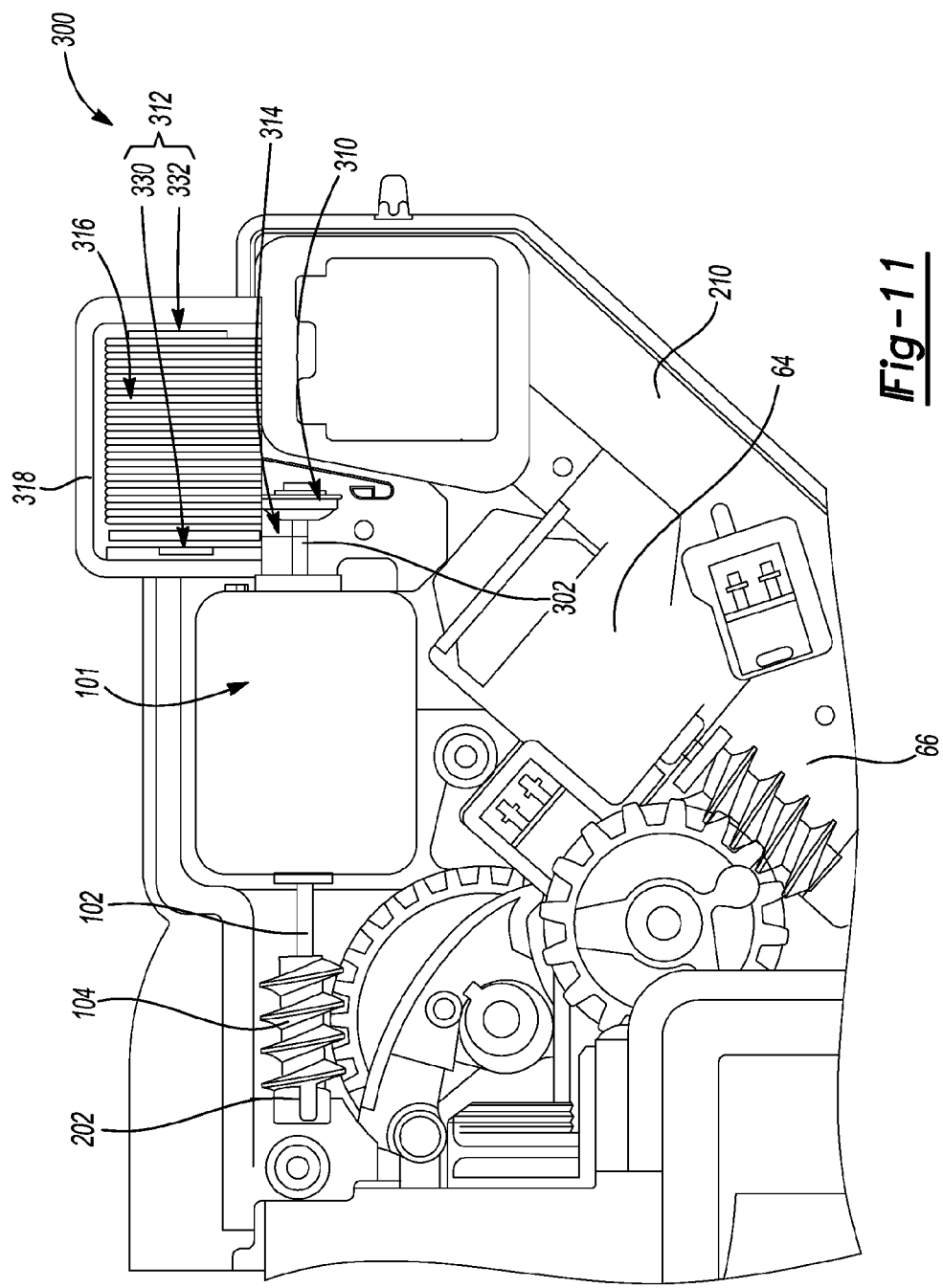
FIG. 11 illustrates a portion of another closure latch assembly equipped with a motor reset mechanism constructed according to the present disclosure and configured to provide a non-powered reset functionality.
Figure 12:
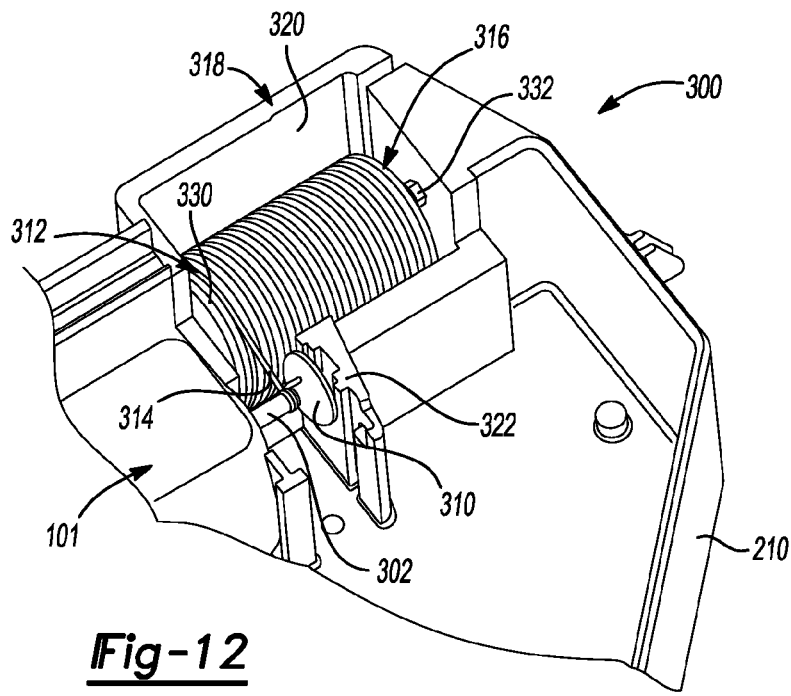
FIG. 12 is an isometric view of the motor reset mechanism shown in FIG. 11 operating in a spring-released state.
Figure 13:
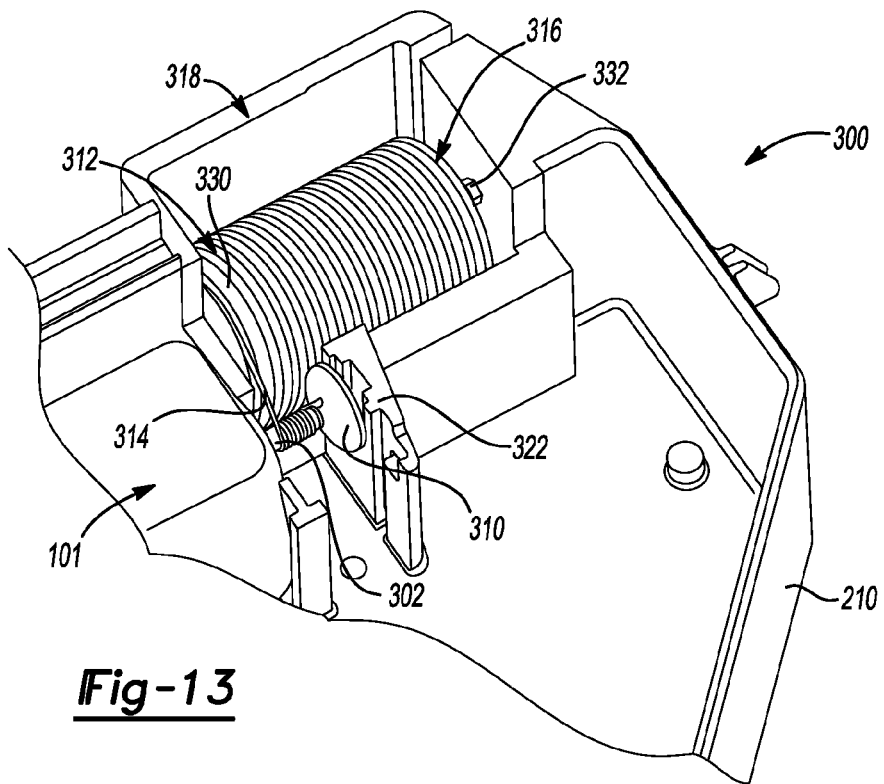
FIG. 13 is similar to FIG. 12 but now illustrates the motor reset mechanism operating in a spring-loaded state.

As noted above, a non-powered reset function is provided in association with power release actuator 200 of closure latch assembly 10 via use of return spring 208 acting on power release gear 202 for backdriving motor shaft 102 of power release motor 101. The use of return spring 208 downstream of the gear reduction unit (power release gear 202 and worm gear 104) provides a gear ratio between power release gear 202 and motor shaft 102 that assists in providing sufficient torque to effectively back drive electric motor 101 and provide the non-powered reset function of the latch release mechanism. As an alternative to this arrangement, FIGS. 11-13 illustrate a motor reset mechanism 300 acting directly on a shaft extension segment 302 of motor shaft 102 of power release motor 101 and which is adapted for installation within a slightly modified version of closure latch assembly 10. Accordingly, the following detailed description of the components, configuration and functionality of motor reset mechanism 300, while shown in association with power release motor 101 of power release actuator 200, is non-limiting and considered applicable to any power-operated "actuatable" mechanism (i.e. power release, power cinch, power lock, door presenters, etc.) requiring a non-powered reset function.

Referring now to FIGS. 11-13, motor reset mechanism 300 is shown in this non-limiting configuration, to generally include an arbor 310 fixed for common rotation with shaft extension segment 302 of motor shaft 102, a pulley unit 312, a drive cable 314 interconnecting pulley unit 312 to arbor 310, and a reset spring 316. Latch housing 210 is shown to include a reset mechanism housing section 318 defining a drive chamber 320. Shaft extension segment 302 of motor shaft 102 is shown rotatably supported by a boss segment 322 of housing section 318. Arbor 310 is shown fixed to shaft extension segment 302 in proximity to boss segment 322. Pulley unit 312 is disposed within chamber 320 and generally includes a pulley segment 330 and a pulley shaft segment 332. Pulley shaft segment 332 has its opposite ends supported in retention apertures formed in the sidewalls of housing section 318 within chamber 320 to rotatably mount pulley unit 312 therein. Reset spring 316 is shown to be a coil spring arranged to surround pulley shaft segment 332 of pulley unit 312. Coil spring 316 acts between pulley shaft segment 332 and latch housing section 318 and, as will be detailed, is pre-loaded to provide a directional bias. Drive cable 314 is wound partially on pulley segment 330 and has a first cable end fixedly secured to arbor 310 and a second cable end fixedly secured to pulley segment 330.

FIG. 12 illustrates motor reset mechanism 300 operating in a first or "rest" (spring-released) state that is established when power release motor 101 is operating in its non-powered state and the latch release mechanism is operating in its non-actuated state such that motor shaft 102 is located in a rest position. As noted, coil spring 316 is pre-loaded when motor shaft 102 located in its rest position such that it generates a pull force on drive cable 316 resulting in a reset torque being exerted on motor shaft 102. The reset torque functions to positively locate motor shaft 102 in its rest position and is greater than the torque required to rotate motor shaft 102 (and the gear reduction unit) under a no-load condition for electric motor 101. Thus, the latch release mechanism is reset in its non-actuated state in preparation for subsequent signaling by ECU 60 of the next power release requirement.

In contrast to FIG. 12, FIG. 13 illustrates motor reset mechanism 300 operating in a second or "loaded" (spring-loaded) state established when electric motor 101 is powered and rotates motor shaft 102 in the actuation direction from its rest position to a power release position, whereby the latch release mechanism has been shifted into its actuated state. As seen, this shifting of the latch release mechanism requires motor shaft 102 to be rotates through a plurality of complete rotations, as indicated by the number of winded loops of drive cable 314 on shaft extension 302. This cable "wrapping" action results in drive cable 314 rotating coil spring 316, in opposition to its normally biasing direction, and functions to store a spring load in pulley unit 312. Upon completion of the latch release mechanism being shifted into its actuated state, electric motor 102 is shifted into its power-off state. As such, the stored spring load is released and reset mechanism 300 functions to generate a sufficient reset torque capable of driving motor shaft 102 back to its rest position, thereby providing the non-powered reset function.

The configuration of reset mechanism 300 as a spring-loaded belt-type (i.e. pulley) reduction mechanism provides a ratio reduction between coil spring 314 and motor shaft 102 that is selected to generate sufficient reset torque for completely rotating motor shaft 102 back to its rest position. This ratio reduction established because of the relative diameters of pulley segment 332 and motor shaft extension 302, reduces the rotary motion of coil spring 314 that is required to generate the reset torque. This solution provides a configuration for locating a spring-type reset mechanism upstream of electric motor 101 so as to overcome the issues and problems associated with conventional arrangements.

As discussed above, some motor applications require the electric motor 101 to be powered in one direction to perform work—for example latch power release or cinch. At the end of such an operation, the electric motor 101 is rotated out of its rest or neutral/home position and not ready to perform the next cycle, therefore it needs to be returned to the neutral/home position. In applications in which any noise or efficiency losses associated with return springs 208, 314 and/or gear trains that interface the motor shaft 102 could be undesirable, the return spring 208, 314 and/or gear train can be replaced by an electronic reset circuit mechanism 400, 400' described below.

The electronic reset circuit mechanism 400, 400' can be used as part of the closure latch assembly 10 described above that includes the latch mechanism 30, 32 operable in a first state to locate the closure panel 12 in a first position and in a second state to locate the closure panel 12 in a second position. The power actuator used with the electronic reset circuit mechanism 400, 400' can, for example, include the actuatable mechanism 104, 106, 108 being operable in a non-actuated state to permit the latch mechanism 30, 32 to operate in its first state and in an actuated state to shift the latch mechanism 30, 32 from its first state into its second state. It should be understood that electronic reset circuit mechanism 400, 400' could alternatively be used as part of another type of power actuator besides that used in closure latch assembly 10.

Figure 14:
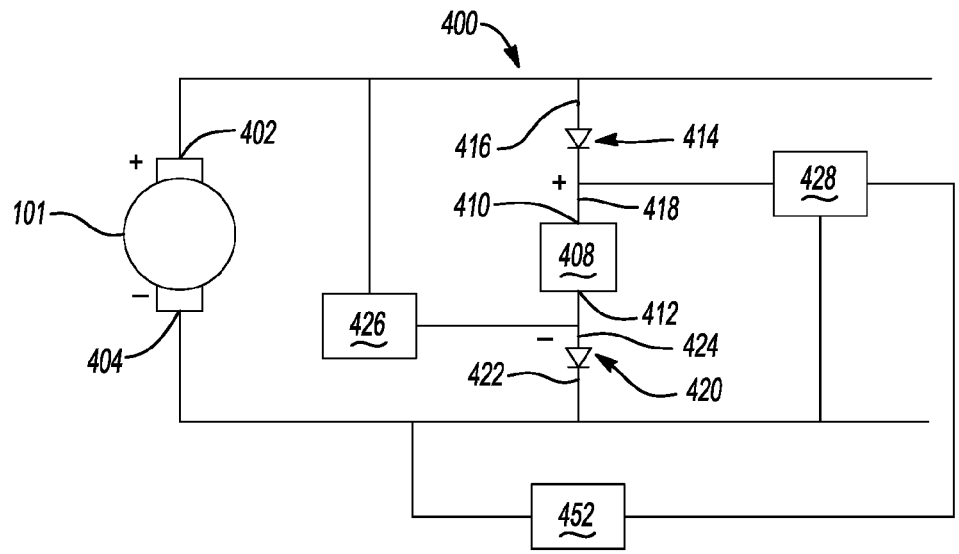
FIG. 14 is a schematic of an electronic reset circuit mechanism of a closure latch assembly.
Figure 15A:
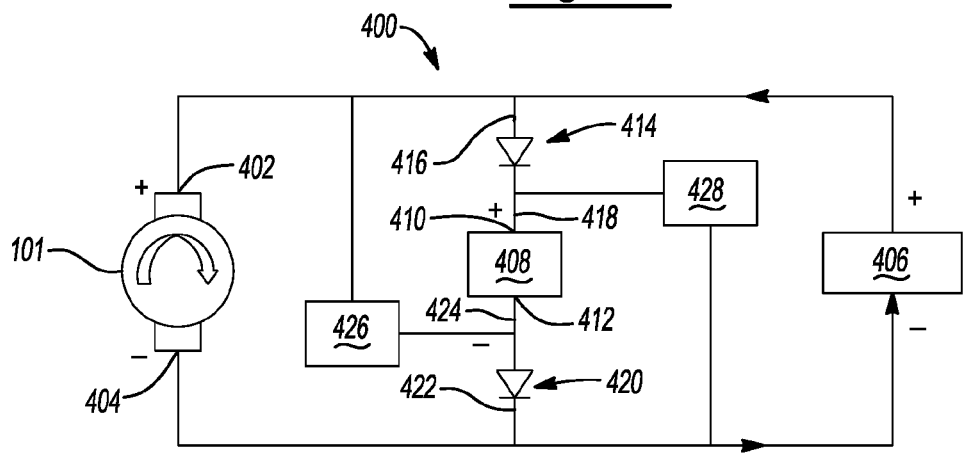
FIGS. 15A and 15B illustrate operation of the electronic reset circuit mechanism of FIG. 14 in an energy storing state and an energy discharge state.
Figure 15B:
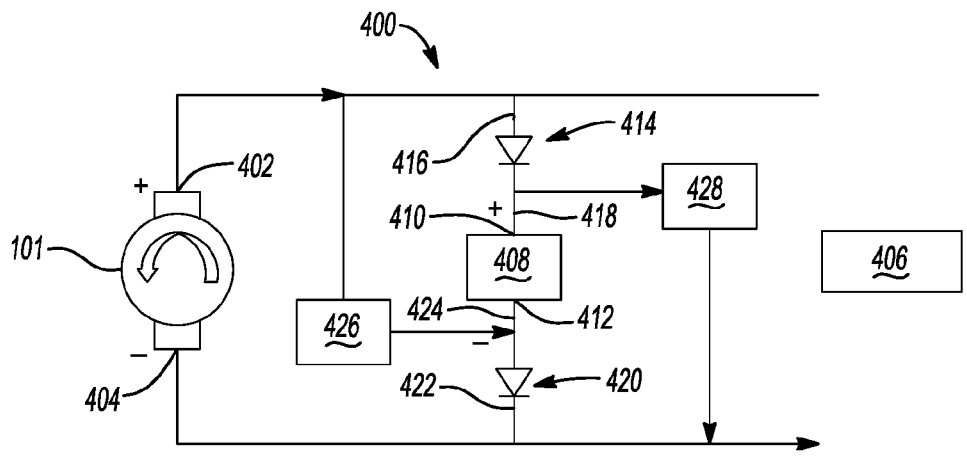

As best shown in FIGS. 14 and 15A-15B, the power actuator also includes the electric motor 101 having the rotary motor shaft 102 and including a first motor terminal 402 (e.g., a positive motor terminal) and a second motor terminal 404 (e.g., a negative motor terminal). The power actuator also includes a controlling circuit 406 (FIG. 15A) selectively coupled to the electric motor 101 for controlling the electric motor 101 in a power-on state to drive the motor shaft 102 in an actuation direction for causing the actuatable mechanism 104, 106, 108 to shift from its non-actuated state into its actuated state.

A first embodiment of the electronic reset circuit mechanism 400 has an energy storage device 408, which may in one possible configuration be a secondary power supply that is local, that includes a positive energy storage terminal 410 and a negative energy storage terminal 412 and is operatively coupled to the electric motor 101. The electronic reset circuit mechanism 400 could additionally include a boosting circuit (not shown) coupled to the energy storage device 408, if a constant voltage is desired. The electronic reset circuit mechanism 400 is configured to operate in an energy storing state (FIG. 15A) to store electrical energy supplied to the electric motor 101 in the energy storage device 408 in response to the controlling circuit 406 being coupled to the electric motor 101, and in other words in a state where power is supplied to the electric motor 101, and rotating the rotary motor shaft 102 in the actuation direction from a first or neutral position to a second position. The electronic reset circuit mechanism 400 is configured to transition from its energy storing state into an energy discharge state (FIG. 15B) in response to the actuatable mechanism 104, 106, 108 being in its actuated state and the controlling circuit 406 being decoupled from the electric motor 101, and in other words in a state where no power is supplied or not being supplied or being stopped, to the electric motor 101. Electronic reset circuit mechanism 400 may be configured to automatically, and/or immediately, control the supply of power to the motor 101 using power from the local secondary power supply by transitioning the energy storage device 408 from its energy storing state into an energy discharge state in response to the actuatable mechanism being operated in a power reset mode upon detecting a stop in the flow of power being supplied to the electronic reset circuit mechanism 400, such as by detecting the controlling circuit 406 being decoupled from the electronic reset circuit mechanism 400, or detecting a voltage drop being supplied to the electric motor 101, or as a result of circuit or switch transitions caused by the stoppage in power supplied by the controlling circuit 406 as described herein. The electronic reset circuit mechanism 400 is operable in its energy discharge state to discharge the electrical energy from the energy storage device 408 into the electric motor 101 in an opposite polarity direction for causing the electric motor 101 to rotate the rotary motor shaft 102 in a reset direction from its second position back to its first position, so as to reset the actuatable mechanism 104, 106, 108 in its non-actuated state for providing a powered reset function.

In more detail, the electronic reset circuit mechanism 400 includes a first diode 414 that has a first diode anode 416 connected to the first motor terminal 402 and a first diode cathode 418 connected to the positive energy storage terminal 410 for isolating the energy storage device 408. The electronic reset circuit mechanism 400 also includes a second diode 420 that has a second diode cathode 422 connected to the second motor terminal 404 and a second diode anode 424 connected to the negative energy storage terminal 412 for isolating the energy storage device 408. The electronic reset circuit mechanism 400 additionally includes a low side switch 426 connected between the first motor terminal 402 and the negative energy storage terminal 412 for selectively allowing current flow from the first motor terminal 402 to the negative energy storage terminal 412 in a low side on state (FIG. 15B) and preventing current flow from the first motor terminal 402 to the negative energy storage terminal 412 in a low side off state (FIG. 15A). A high side switch 428 is connected between the second motor terminal 404 and the positive energy storage terminal 410 for selectively allowing current flow from the positive energy storage terminal 410 to the second motor terminal 404 in a high side on state (FIG. 15B) and preventing current flow from the positive energy storage terminal 410 to the second motor terminal 404 in a high side off state (FIG. 15A).

Figure 16:
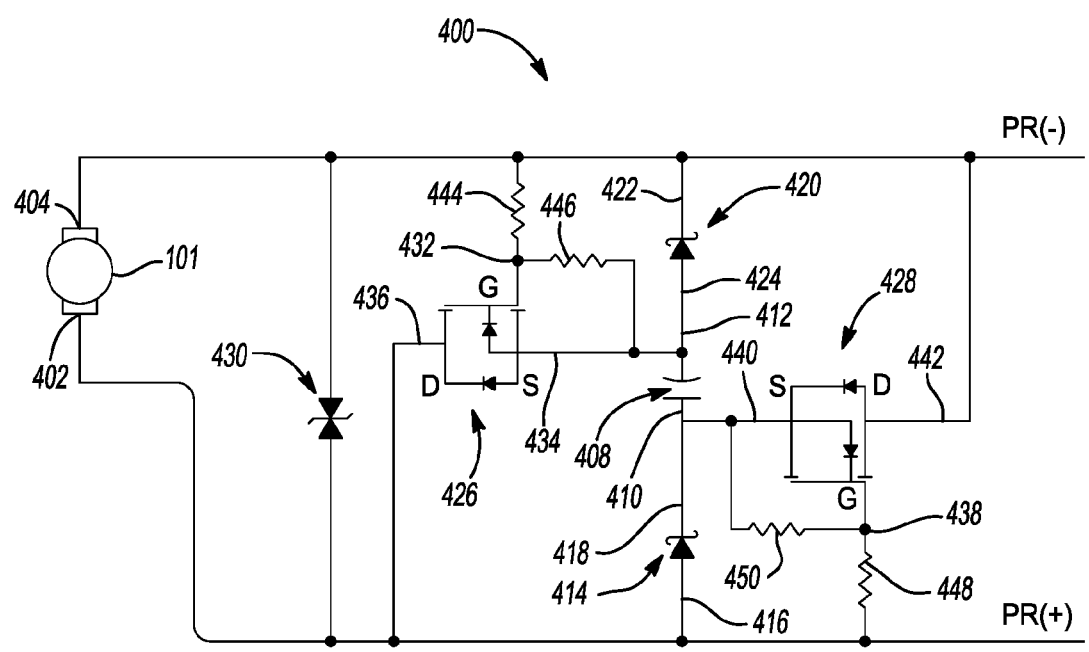
FIG. 16 is a circuit schematic of a first embodiment of the electronic reset circuit mechanism according to aspects of the disclosure.

According to an aspect and as best shown in FIG. 16, the energy storage device 408 is a capacitor, the low side switch 426 is a low side metal oxide semiconductor field-effect transistor, the high side switch 428 is a high side metal oxide semiconductor field-effect transistor, and the first diode 414 and the second diode 420 are each zener diodes; however, it should be appreciated that other types of diodes 414, 420, energy storage devices 408, and switches 426, 428 may alternatively be used. A transient voltage suppression (TVS) diode 430 is shown connected between the first motor terminal 402 and the second motor terminal 404 in parallel with the electric motor 101 for suppressing transient voltages between the first motor terminal 402 and the second motor terminal 404.

The low side metal oxide semiconductor field-effect transistor 426 includes a low side gate 432 coupled to the negative energy storage terminal 412 and the second motor terminal 404 through a low side resistor 433 and a low side source 434 connected to the negative energy storage terminal 412 and a low side drain 436 connected to the first motor terminal 402. Similarly, the high side metal oxide semiconductor field-effect transistor 428 includes a high side gate 438 coupled to the positive energy storage terminal 410 and the first motor terminal 402 and a high side source 440 connected to the positive energy storage terminal 410 and a high side drain 442 connected to the second motor terminal 404. A first low side resistor 444 is connected between the low side gate 432 and the second motor terminal 404. A second low side resistor 446 is connected between the low side gate 432 and the low side source 434. The electronic reset circuit mechanism 400 further includes a first high side resistor 448 connected between the high side gate 438 and the first motor terminal 402 and a second high side resistor 450 connected between the high side gate 438 and the high side source 440.

Consequently, the low side switch 426 is configured to be in the low side off state and the high side switch 428 is configured to be in the high side off state in response to the controlling circuit 406 being coupled to the electric motor 101 (e.g., through PR(−) and PR(+) terminals) and rotating the rotary motor shaft 102 in the actuation direction. In addition, the low side switch 426 is configured to be in the low side on state and the high side switch 428 is configured to be in the high side on state in response to the actuatable mechanism 104, 106, 108 being in its actuated state and the controlling circuit 406 being decoupled from the electric motor 101 (i.e., tristate or high impedance state) (e.g., decoupled from the PR(−) and PR(+) terminals). In other words, the gates 432, 438 of the low side switch 426 and the high side switch 428 are controlled by the opposite transistor's 426, 428 drain 436, 442 and the voltage to the electric motor 101 is reversed as the transistors 426, 428 turn on.

While as described above, the low side switch 426 and high side switch 428 will automatically be put into a state to provide power when the driving or controlling circuit 406 power is removed, a controller could be provided to control the switches to make this determination when the reset would occur. Thus, referring back to FIG. 14, the power actuator can also include a switching logic controller 452 (e.g., ECU 60 or provided separately) coupled to the low side switch 426 (low side gate 432) and the high side switch 428 (high side gate 438) and configured to detect the controlling circuit 406 being coupled to the electric motor 101 and turn the low side switch 426 to the low side off state and the high side switch 428 to the high side off state in response to the controlling circuit 406 being coupled to the electric motor 101 and rotating the rotary motor shaft 102 in the actuation direction. The switching logic controller 452 can also detect the actuatable mechanism 104, 106, 108 being in its actuated state and the controlling circuit 406 being coupled to the electric motor 101. As a result, the switching logic controller 452 turns the low side switch 426 to the low side on state and the high side switch 428 to the high side on state in response to the actuatable mechanism 104, 106, 108 being in its actuated state and the controlling circuit 406 being decoupled from the electric motor 101.

So, the electronic reset circuit mechanism 400 stores energy from an electrical activation pulse provided to the electric motor 101 during activation or power release and reverses it across the electric motor 101 once the driving voltage has been turned off (i.e., power reset). The electronic reset circuit mechanism 400 therefore has the advantage of having no moving parts, and can be scaled easily by choosing a different energy storage device 408.

Figure 17:
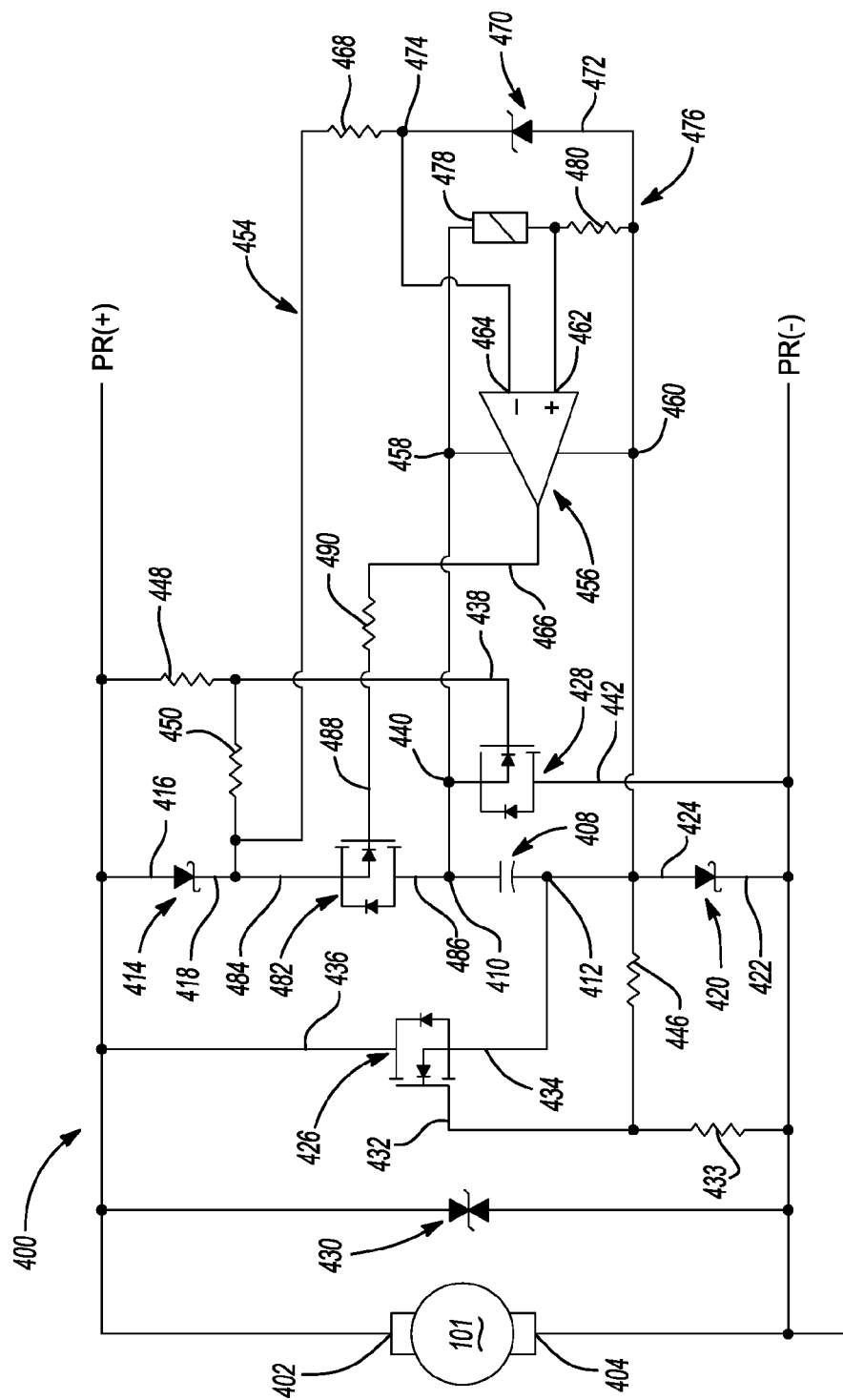
FIG. 17 is a circuit schematic of a second embodiment of the electronic reset circuit mechanism according to aspects of the disclosure.

Referring to FIG. 17, a second embodiment of the electronic reset circuit mechanism 400' is shown. Like the first embodiment of the electronic reset circuit mechanism 400, the electronic reset circuit mechanism 400' has an energy storage device 408 that includes a positive energy storage terminal 410 and a negative energy storage terminal 412 and is operatively coupled to the electric motor 101. Again, the electronic reset circuit mechanism 400' is configured to operate in the energy storing state (FIG. 15A) to store electrical energy supplied to the electric motor 101 in the energy storage device 408 in response to the controlling circuit 406 being coupled to the electric motor 101 and rotating the rotary motor shaft 102 in the actuation direction from a first or neutral position to a second position. The electronic reset circuit mechanism 400' is configured to transition from its energy storing state into the energy discharge state (FIG. 15B) in response to the actuatable mechanism 104, 106, 108 being in its actuated state and the controlling circuit 406 being decoupled from the electric motor 101. The electronic reset circuit mechanism 400' is operable in its energy discharge state to discharge the electrical energy from the energy storage device 408 into the electric motor 101 in an opposite polarity direction for causing the electric motor 101 to rotate the rotary motor shaft 102 in a reset direction from its second position back to its first position, so as to reset the actuatable mechanism 104, 106, 108 in its non-actuated state for providing a powered reset function.

As with the first embodiment of the electronic reset circuit mechanism 400, the electronic reset circuit mechanism 400' includes a first diode 414 that has a first diode anode 416 connected to the first motor terminal 402 and a first diode cathode 418 connected to the positive energy storage terminal 410 for isolating the energy storage device 408. The electronic reset circuit mechanism 400' also includes a second diode 420 that has a second diode cathode 422 connected to the second motor terminal 404 and a second diode anode 424 connected to the negative energy storage terminal 412 for isolating the energy storage device 408.

The electronic reset circuit mechanism 400' additionally includes a low side switch 426 connected between the first motor terminal 402 and the negative energy storage terminal 412 for selectively allowing current flow from the first motor terminal 402 to the negative energy storage terminal 412 in a low side on state and preventing current flow from the first motor terminal 402 to the negative energy storage terminal 412 in a low side off state. A high side switch 428 is connected between the second motor terminal 404 and the positive energy storage terminal 410 for selectively allowing current flow from the positive energy storage terminal 410 to the second motor terminal 404 in a high side on state and preventing current flow from the positive energy storage terminal 410 to the second motor terminal 404 in a high side off state.

The energy storage device 408 is a capacitor, the low side switch 426 is a low side metal oxide semiconductor field-effect transistor, the high side switch 428 is a high side metal oxide semiconductor field-effect transistor, and the first diode 414 and the second diode 420 are each zener diodes; nevertheless, it should be appreciated that other types of diodes 414, 420, energy storage devices 408, and switches 426, 428 may alternatively be used. A transient voltage suppression (TVS) diode 430 is shown connected between the first motor terminal 402 and the second motor terminal 404 in parallel with the electric motor 101 for suppressing transient voltages between the first motor terminal 402 and the second motor terminal 404.

The low side metal oxide semiconductor field-effect transistor 426 includes a low side gate 432 coupled to the negative energy storage terminal 412 and the second motor terminal 404 and a low side source 434 connected to the negative energy storage terminal 412 and a low side drain 436 connected to the first motor terminal 402. Similarly, the high side metal oxide semiconductor field-effect transistor 428 includes a high side gate 438 coupled to the positive energy storage terminal 410 and the first motor terminal 402 and a high side source 440 connected to the positive energy storage terminal 410 and a high side drain 442 connected to the second motor terminal 404. A first low side resistor 444 is connected between the low side gate 432 and the second motor terminal 404. A second low side resistor 446 is connected between the low side gate 432 and the low side source 434. The electronic reset circuit mechanism 400' further includes a first high side resistor 448 connected between the high side gate 438 and the first motor terminal 402 and a second high side resistor 450 connected between the high side gate 438 and the high side source 440.

Thus, the low side switch 426 is configured to be in the low side off state and the high side switch 428 is configured to be in the high side off state in response to the controlling circuit 406 being coupled to the electric motor 101 and rotating the rotary motor shaft 102 in the actuation direction. In addition, the low side switch 426 is configured to be in the low side on state and the high side switch 428 is configured to be in the high side on state in response to the actuatable mechanism 104, 106, 108 being in its actuated state and the controlling circuit 406 being decoupled from the electric motor 101 (i.e., tristate or high impedance state). In other words, the gates 432, 438 of the low side switch 426 and the high side switch 428 are controlled by the opposite transistor's 426, 428 drain 436, 442 and the voltage to the electric motor 101 is reversed as the transistors 426, 428 turn on.

As with the first embodiment of the electronic reset circuit mechanism 400, the low side switch 426 and high side switch 428 will automatically be put into a state to provide power when the driving or controlling circuit 406 power is removed; however, the power actuator can also include the switching logic controller 452 (e.g., ECU 60 or provided separately) coupled to the low side switch 426 (low side gate 432) and the high side switch 428 (high side gate 438). The switching logic controller 452 is configured to detect the controlling circuit 406 being coupled to the electric motor 101 and turn the low side switch 426 to the low side off state and the high side switch 428 to the high side off state in response to the controlling circuit 406 being coupled to the electric motor 101 and rotating the rotary motor shaft 102 in the actuation direction. The switching logic controller 452 can also detect the actuatable mechanism 104, 106, 108 being in its actuated state and the controlling circuit 406 being coupled to the electric motor 101. As a result, the switching logic controller 452 turns the low side switch 426 to the low side on state and the high side switch 428 to the high side on state in response to the actuatable mechanism 104, 106, 108 being in its actuated state and the controlling circuit 406 being decoupled from the electric motor 101.

The electronic reset circuit mechanism 400' additionally includes a charge control circuit 454 for preventing overcharging of the energy storage device 408 (e.g., if the power supply, such as a main power supply provided from a vehicle battery or other power supply source located remotely in the door 12, the latch 10 or other location in the vehicle or as supplied from an external backup source e.g. such as a hand held backup power source coupled via an external interface port or plug for supplying power to the motor 101, as examples, driving the electric motor 101 is higher than a rating of the energy storage device or capacitor 408). The charge control circuit 454 includes a comparator 456 including a positive comparator supply terminal 458 connected to the positive energy storage terminal 410 of the energy storage device 408 and a negative comparator supply terminal 460 connected to the negative energy storage terminal 412 of the energy storage device 408. The comparator 456 also includes a positive comparator input 462 and a negative comparator input 464 and a comparator output 466. The comparator 456 is configured to compare a first voltage at the positive comparator input 462 to a second voltage at the negative comparator input 464 and output a comparator output voltage at the comparator output 466 if the first voltage is larger than the second voltage. A current limiting resistor 468 is connected between the first diode cathode 418 and the negative comparator input 464. The charge control circuit 454 also includes a fixed voltage diode 470 (e.g., a zener diode) that has a fixed voltage diode anode 472 connected to the negative energy storage terminal 412 and a fixed voltage diode cathode 474 connected to the negative comparator input 464. More specifically, the fixed voltage diode 470 is reverse biased by a current through the current limiting resistor 468 to provide the second voltage at the negative comparator input 464.

The charge control circuit 454 additionally includes a voltage divider 476 including a negative temperature coefficient thermistor 478 connected between the positive energy storage terminal 410 and the positive comparator input 462 for decreasing an electrical resistance as an energy storage temperature increases. The energy storage temperature is the temperature of the energy storage device 408 (e.g., capacitor). The voltage divider 476 also includes a divider resistor 480 connected between the positive comparator input 462 and the negative energy storage terminal 412 to provide the first voltage at the positive comparator input 462. Specifically, the first voltage corresponds to the energy storage temperature. Thus, the charge control provided by the charge control circuit 454 is temperature based. A high energy storage temperature detected by the negative temperature coefficient thermistor 478 results in the energy storage device 408 being charged less or at a lower rate than if a lower energy storage temperature is detected by the negative temperature coefficient thermistor 478.

In addition, the charge control circuit 454 includes a charge control switch 482 coupled between the first motor terminal 402 and the positive energy storage terminal 410 for selectively allowing current flow from the first motor terminal 402 to the positive energy storage terminal 410 in a charge enable state based on the comparator output voltage. According to an aspect, the charge control switch 482 is a metal oxide semiconductor field-effect transistor; however, other switching devices may alternatively be used. The charge control switch 482 also prevents current flow from the first motor terminal 402 to the positive energy storage terminal 410 in a charge disable state based on the comparator output voltage. The charge control switch 482 includes a charge control source 484 connected to the first diode cathode 418 and a charge control drain 486 connected to the positive energy storage terminal 410 and a charge control gate 488 coupled to the comparator output 466. A comparator output resistor 490 is connected between the comparator output 466 and the charge control gate 488 of the charge control switch 482.

In operation, the electronic reset circuit mechanism 400' including the charge control circuit 454 will, once tuned, charge the energy storage device 408 (e.g., capacitor) to a desired voltage, set by the voltage divider 476 with the negative temperature coefficient thermistor 478. As mentioned above, the negative temperature coefficient thermistor 478 has a lower resistance as it gets hotter, so that at a cold or lower energy storage temperature, the energy storage device 408 is charged to a higher voltage than at hotter or higher energy storage temperature. For example, the desired voltage can be 16V even though a voltage driving the electric motor 101 is 24V. In more detail, the charge control circuit 454 works by comparing the voltage across the energy storage device 408, using the voltage divider 476, where the top half is the negative temperature coefficient thermistor 478. As the energy storage temperature increases, the first voltage at the positive comparator input 462 of the comparator 456 increases. The first voltage is compared against a fixed voltage (i.e., the second voltage), created by the fixed voltage diode 470. For example, the second voltage may be approximately 4-5V. Once higher than the second voltage, the charge control switch 482 will turn off (i.e., transition to the charge disable state) and the charging of the energy storage device 408 stops. At hotter or higher energy storage temperature, the electronic reset circuit mechanism 400' charges less than at cold. Thus, for example, the resistance value of the resistors (e.g., the current limiting resistor 468 and divider resistor 480) may be selected to tune the charge control circuit 454 to cause the charge control switch 482 to transition to the charge disable state, if charging to more than 16V, no matter the temperature.

Like the first embodiment of the electronic reset circuit mechanism 400, the second embodiment of the electronic reset circuit mechanism 400' stores energy from an electrical activation pulse provided to the electric motor 101 during activation or power release and reverses it across the electric motor 101 once the driving voltage has been turned off (i.e., power reset). However, in addition, the charge control circuit 454 prevents overcharging of the energy storage device 408.

Figure 18:
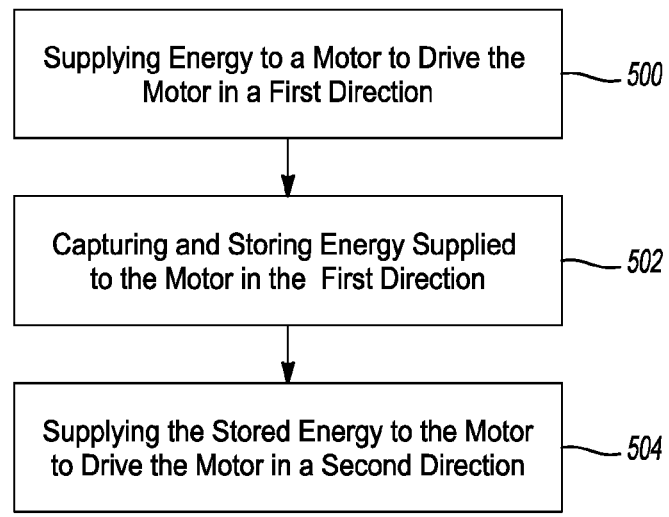
FIG. 18 illustrates steps of a method of operating a power actuator for a closure latch assembly including an electric motor and the electronic reset circuit mechanism of FIG. 14.

A method of operating the power actuator including the electronic reset circuit mechanism 400, 400' is also provided, as best shown in FIG. 18. The method includes the step of 500 supplying energy to an electric motor 101 to rotate a rotary motor shaft 102 of the electric motor 101 in an actuation direction using a controlling circuit 406 coupled to the electric motor 101. The method continues with the step of 502 capturing and storing electric energy supplied to the electric motor 101 in the energy storage device 408 in response to the controlling circuit 406 being coupled to the electric motor 101 and rotating the rotary motor shaft 102 in the actuation direction from a first position (e.g., neutral position) to a second position using the electronic reset circuit mechanism 400, 400'. The method then includes the step of 504 discharging the electrical energy from the energy storage device 408 into the electric motor 101 in an opposite polarity direction and causing the electric motor 101 to rotate the rotary motor shaft 102 in a reset direction opposite the actuation direction from the second position back to the first position in response to the rotary motor shaft 102 being in the second position and the controlling circuit 406 being decoupled from the electric motor 101 using the electronic reset circuit mechanism 400.

Specifically referring to the electronic reset circuit mechanism 400' including the charge control circuit 454, the method can additionally include the step of detecting an energy storage temperature of the energy storage device 408 using a negative temperature coefficient thermistor 478 and providing a first voltage corresponding to the energy storage temperature at a positive comparator input 462 of a comparator 456. The method can also include the step of providing a second voltage at a negative comparator input 464 of the comparator 456 using a fixed voltage diode 470. The next step of the method is comparing the first voltage at the positive comparator input 462 to the second voltage at the negative comparator input 464 and outputting a comparator output voltage at a comparator output 466 in response to the first voltage being larger than the second voltage using the comparator 456. The method then can proceed by selectively allowing current flow from the electric motor 101 to the energy storage device 408 in a charge enable state and preventing current flow from the electric motor 101 to the energy storage device 408 in a charge disable state based on the comparator output voltage.

Figure 19:
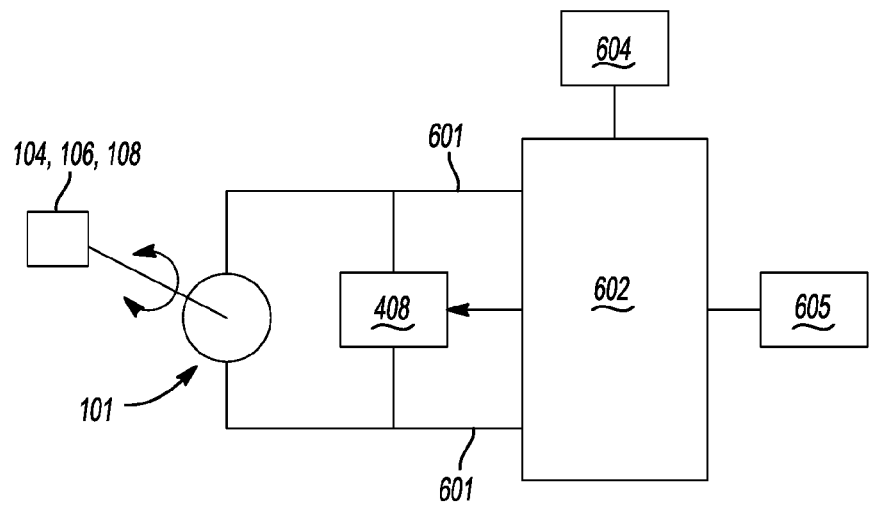
FIG. 19 is a block diagram of an electronic reset system of a closure latch assembly, in accordance with an illustrative embodiment.

Now referring to FIG. 19, there is provided an electronic reset system 600 of a closure latch assembly (e.g., closure latch assembly 10), in accordance with an illustrative embodiment, including a controller 602. The controller 602 may include the circuits as described herein above, or be embodied in a microprocessor, for example, coupled to the electric motor 101 and the energy storage device 408. Again, the energy storage device 408 is operatively coupled to the electric motor 101 and configured to operate in an energy storing state to store electrical energy and in an energy discharge state to discharge the electrical energy. The controller 602 is configured to control the electric motor 101 in a power-on state to drive the motor shaft in an actuation direction from a first position to a second position for causing the actuatable mechanism 104, 106, 108 to shift from its non-actuated state into its actuated state. The controller 602 is coupled to a power supply 604 (e.g., a battery of the vehicle 14) and is connected to the electric motor 101 through power supply lines 601. The controller 602 provides driving signals over the power supply lines 601 at appropriate voltage levels generated using power supplied a power source coupled to the controller 602. Controller 602 is further configured to control the transition of the energy storage device 408, coupled to the power supply lines 601 in parallel with controller 602 as an illustrative example, from its energy storing state into an energy discharge state in response to the actuatable mechanism 104, 106, 108 being operated in a power reset mode for powering the electric motor 101 using the stored electrical energy in the energy storage device 408 to cause the actuatable mechanism 104, 106, 108 to shift from the second position to the first position so as to reset the actuatable mechanism 104, 106, 108 in its non-actuated state for providing a powered reset function. Controller 602 may be configured to automatically control the transition of the energy storage device 408 from its energy storing state into an energy discharge state in response to the actuatable mechanism being operated in a power reset mode by detecting a stop in the flow of power being supplied. Controller 602 may be programmed with a method, which may be stored in a memory unit coupled to a microprocessor of the control 602, the method including the steps of monitoring a supply of power from a main power source for controlling the rotation of a motor in a first direction, monitoring stoppage in the supply of power from the main power source, and next in response to detecting the stoppage in the supply of power from the main power source, and for example in immediate response to detecting the stoppage in the supply of power from the main power source, controlling a secondary power source to supply power to the motor for controlling the rotation of the motor in a second direction.

Controller 602 may be further configured to control the charging of the energy storage device 408 using energy from the power supply 604 to a predetermined voltage level. For example, controller 602 may be further configured to charge the energy storage device 408 to one of a maximum capacity charge voltage level of the energy storage device 408 and a voltage level below the maximum capacity charge voltage level. The electronic reset system 600 further including a temperature sensor 605 in communication with the controller 602 for determining a temperature of the energy storage device 408. So, the controller 602 may be further configured to charge the energy storage device 408 to a charge voltage level based on different criteria, for example based on the temperature as determined a temperature sensor 605 in communication with the controller 602, which determines the temperature of the energy storage device 408. Thus, the controller 602 is further configured to charge the energy storage device 408 to a charge voltage level based on at least one factor chosen from the group consisting of the temperature of the energy storage device 408, a maximum storage capacity of the storage device 408, an age of the storage device 408, and an age of the actuatable mechanism 104, 106, 108, as but examples.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electronic reset system of a closure latch assembly comprising:
    an electric motor having a motor shaft driven in one of an actuation direction and a reset direction opposite the actuation direction for moving an actuatable mechanism between an actuated and a non-actuated state;
    an energy storage device operatively coupled to the electric motor and configured to operate in an energy storing state to store electrical energy and in an energy discharge state to discharge the electrical energy; and
    a controller coupled to the electric motor and the energy storage device, the controller configured to:
    control the electric motor in a power-on state to drive the motor shaft in the actuation direction from a first position to a second position for causing the actuatable mechanism to shift from its non-actuated state into its actuated state, and
    control a transition of the energy storage device from the energy storing state into the energy discharge state in response to the actuatable mechanism being operated in a power reset mode for powering the electric motor using the stored electrical energy in the energy storage device to cause the actuatable mechanism to shift from the second position to the first position so as to reset the actuatable mechanism in its non-actuated state for providing a powered reset function.

2. The electronic reset system as set forth in claim 1, wherein the controller is coupled to a power supply and connected to the electric motor through power supply lines and the controller is further configured to provide driving signals over the power supply lines at appropriate voltage levels generated using power supplied from the power supply.

3. The electronic reset system as set forth in claim 1, wherein the controller is further configured to control charging of the energy storage device using energy from a power supply to a predetermined voltage level.

4. The electronic reset system as set forth in claim 3, wherein the controller is further configured to charge the energy storage device to one of a maximum capacity charge voltage level of the energy storage device and a voltage level below the maximum capacity charge voltage level.

5. The electronic reset system as set forth in claim 1, further including a temperature sensor in communication with the controller for determining a temperature of the energy storage device and wherein the controller is further configured to charge the energy storage device to a charge voltage level based on at least one factor chosen from the group consisting of the temperature of the energy storage device, a maximum storage capacity of the storage device, an age of the storage device, and an age of the actuatable mechanism.

6. A closure latch assembly for a closure panel of a motor vehicle, comprising:
    a latch mechanism operable in a first state to locate the closure panel in a first position and in a second state to locate the closure panel in a second position;
    a power actuator including an actuatable mechanism being operable in a non-actuated state to permit the latch mechanism to operate in its first state and in an actuated state to shift the latch mechanism from its first state into its second state;
    the power actuator including an electric motor having a rotary motor shaft driven in an actuation direction for causing the actuatable mechanism to shift from its non-actuated state into its actuated state and an electronic reset circuit mechanism having an energy storage device operatively coupled to the electric motor and configured to operate in an energy storing state to store electrical energy supplied to the electric motor in the energy storage device and in an energy discharge state to discharge the electrical energy from the energy storage device into the electric motor in an opposite polarity direction for causing the electric motor to rotate the rotary motor shaft in a reset direction so as to reset the actuatable mechanism in its non-actuated state for providing a powered reset function; and the power actuator including a controlling circuit selectively coupled to the electric motor for controlling the electric motor in a power-on state to drive the motor shaft in an actuation direction for causing the actuatable mechanism to shift from its non-actuated state into its actuated state, the electronic reset circuit mechanism configured to operate in the energy storing state in response to the controlling circuit being coupled to the electric motor and rotating the rotary motor shaft in the actuation direction from a first position to a second position, the electronic reset circuit mechanism configured to transition from its energy storing state into an energy discharge state in response to the actuatable mechanism being in its actuated state and the controlling circuit being decoupled from the electric motor.

7. The closure latch assembly as set forth in claim 6, wherein the electric motor is a power release motor and the actuatable mechanism is a power release gear operably coupled to a pawl to shift the pawl from a ratchet holding position to a ratchet releasing position in response controlling the electric motor in a power-on state to drive the motor shaft in an actuation direction for causing the power release gear to shift from its non-actuated state into its actuated state.

8. The closure latch assembly as set forth in claim 6, wherein the electronic reset circuit mechanism is operable in its energy discharge state to cause the electric moto to rotate the rotary motor shaft in the reset direction from its second position back to its first position.

9. The closure latch assembly as set forth in claim 6, wherein the energy storage device includes a positive energy storage terminal and a negative energy storage terminal and the electric motor includes a first motor terminal and a second motor terminal and the electronic reset circuit mechanism includes:

a first diode having a first diode anode connected to the first motor terminal and a first diode cathode connected to the positive energy storage terminal for isolating the energy storage device;

a second diode having a second diode cathode connected to the second motor terminal and a second diode anode connected to the negative energy storage terminal for isolating the energy storage device;

a low side switch connected between the first motor terminal and the negative energy storage terminal for selectively allowing current flow from the first motor terminal to the negative energy storage terminal in a low side on state and preventing current flow from the first motor terminal to the negative energy storage terminal in a low side off state; and a high side switch connected between the second motor terminal and the positive energy storage terminal for selectively allowing current flow from the positive energy storage terminal to the second motor terminal in a high side on state and preventing current flow from the positive energy storage terminal to the second motor terminal in a high side off state.

10. The closure latch assembly as set forth in claim 9, further including a switching logic controller coupled to the low side switch and the high side switch and configured to:

detect the controlling circuit being coupled to the electric motor, turn the low side switch to the low side off state and the high side switch to the high side off state in response to the controlling circuit being coupled to the electric motor and rotating the rotary motor shaft in the actuation direction, detect the actuatable mechanism being in its actuated state and the controlling circuit being coupled to the electric motor, and turn the low side switch to the low side on state and the high side switch to the high side on state in response to the actuatable mechanism being in its actuated state and the controlling circuit being decoupled from the electric motor.

11. The closure latch assembly as set forth in claim 9, wherein the low side switch is configured to be in the low side off state and the high side switch is configured to be in the high side off state in response to the controlling circuit being coupled to the electric motor and rotating the rotary motor shaft in the actuation direction and the low side switch is configured to be in the low side on state and the high side switch is configured to be in the high side on state in response to the actuatable mechanism being in its actuated state and the controlling circuit being decoupled from the electric motor.

12. The closure latch assembly as set forth in claim 9, wherein the energy storage device is a capacitor and the low side switch is a low side metal oxide semiconductor field-effect transistor including a low side gate coupled to the negative energy storage terminal and the second motor terminal and a low side source connected to the negative energy storage terminal and a low side drain connected to the first motor terminal and the high side switch is a high side metal oxide semiconductor field-effect transistor including a high side gate coupled to the positive energy storage terminal and the first motor terminal and a high side source connected to the positive energy storage terminal and a high side drain connected to the second motor terminal.

13. The closure latch assembly as set forth in claim 12, further including a first low side resistor connected between the low side gate and the second motor terminal and a second low side resistor connected between the low side gate and the low side source and further including a first high side resistor connected between the high side gate and the first motor terminal and a second high side resistor connected between the high side gate and the high side source.

14. The closure latch assembly as set forth in claim 13, further including a charge control circuit comprising:

a comparator including a positive comparator supply terminal connected to the positive energy storage terminal of the energy storage device and a negative comparator supply terminal connected to the negative energy storage terminal of the energy storage device and a positive comparator input and a negative comparator input and a comparator output and configured to compare a first voltage at the positive comparator input to a second voltage at the negative comparator input and output a comparator output voltage at the comparator output if the first voltage is larger than the second voltage;

a current limiting resistor connected between the first diode cathode and the negative comparator input;

a fixed voltage diode being a zener diode and having a fixed voltage diode anode connected to the negative energy storage terminal and a fixed voltage diode cathode connected to the negative comparator input, the fixed voltage diode being reverse biased by a current through the current limiting resistor to provide the second voltage at the negative comparator input;

a voltage divider including a negative temperature coefficient thermistor connected between the positive energy storage terminal and the positive comparator input for decreasing an electrical resistance as an energy storage temperature increases and a divider resistor connected between the positive comparator input and the negative energy storage terminal to provide the first voltage at the positive comparator input, the first voltage corresponding to the energy storage temperature;

a charge control switch coupled between the first motor terminal and the positive energy storage terminal for selectively allowing current flow from the first motor terminal to the positive energy storage terminal in a charge enable state based on the comparator output voltage and preventing current flow from the first motor terminal to the positive energy storage terminal in a charge disable state based on the comparator output voltage;

the charge control switch including a charge control source connected to the first diode cathode and a charge control drain connected to the positive energy storage terminal and a charge control gate coupled to the comparator output; and a comparator output resistor connected between the comparator output and the charge control gate of the charge control switch.

15. The closure latch assembly as set forth in claim 9, further including a transient voltage suppression diode connected between the first motor terminal and the second motor terminal in parallel with the electric motor for suppressing transient voltages between the first motor terminal and the second motor terminal.

16. A method of operating a power actuator for a closure latch assembly including an electric motor and an electronic reset circuit mechanism including an energy storage device coupled in parallel with the electric motor, comprising the steps of:

supplying energy to the electric motor to rotate a rotary motor shaft of the electric motor in an actuation direction using a controlling circuit coupled to the electric motor;

capturing and storing electric energy supplied to the electric motor in the energy storage device during the step of supplying the energy to the electric motor in response to the controlling circuit being coupled to the electric motor and rotating the rotary motor shaft in the actuation direction from a first position to a second position using the electronic reset circuit mechanism; and discharging the electrical energy from the energy storage device into the electric motor in an opposite polarity direction and causing the electric motor to rotate the rotary motor shaft in a reset direction opposite the actuation direction from the second position back to the first position in response to the rotary motor shaft being in the second position and the controlling circuit being decoupled from the electric motor using the electronic reset circuit mechanism.

17. The method as set forth in claim 16, further including the steps of:

detecting an energy storage temperature of the energy storage device using a negative temperature coefficient thermistor and providing a first voltage corresponding to the energy storage temperature at a positive comparator input of a comparator;

providing a second voltage at a negative comparator input of the comparator using a fixed voltage diode;

comparing the first voltage at the positive comparator input to the second voltage at the negative comparator input and outputting a comparator output voltage at a comparator output in response to the first voltage being larger than the second voltage using the comparator; and selectively allowing current flow from the electric motor to the energy storage device in a charge enable state and preventing current flow from the electric motor to the energy storage device in a charge disable state based on the comparator output voltage.

18. An electronic reset system of a closure latch assembly comprising:

an electric motor having a motor shaft driven in one of an actuation direction and a reset direction opposite the actuation direction for moving an actuatable mechanism between an actuated and a non-actuated state;

an energy storage device operatively coupled to the electric motor and configured to operate in an energy storing state to store electrical energy and in an energy discharge state to discharge the electrical energy; and a controller coupled to the electric motor and the energy storage device, the controller configured to control the electric motor in a power-on state to drive the motor shaft in the actuation direction from a first position to a second position for causing the actuatable mechanism to shift from its non-actuated state into its actuated state;

wherein the energy storage device is operated in the energy storing state during operation of the electric motor.

* * * * *